US012755081B2

(12) United States Patent
Ser et al.

(10) Patent No.: US 12,755,081 B2
(45) Date of Patent: Oct. 6, 2026

(54) CONFIGURATION OF PATTERNING PROCESS

(71) Applicant: ASML NETHERLANDS B.V., Veldhoven (NL)

(72) Inventors: Jung Hoon Ser, Sunnyvale, CA (US); Sungwoon Park, Sejong City (KR); Xin Lei, San Jose, CA (US); Jinwoong Jeong, Hwaseong (KR); Rongkuo Zhao, San Jose, CA (US); Duan-Fu Stephen Hsu, Fremont, CA (US); Xiaoyang Li, Fremont, CA (US)

(73) Assignee: ASML NETHERLANDS, Veldhoven (NL)

( * ) Notice: Subject to any disclaimer, the term of this patent is extended or adjusted under 35 U.S.C. 154(b) by 670 days.

(21) Appl. No.: 18/277,014

(22) PCT Filed: Feb. 25, 2022

(86) PCT No.: PCT/EP2022/054790

§ 371 (c)(1),
(2) Date: Aug. 11, 2023

(87) PCT Pub. No.: WO2022/184578

PCT Pub. Date: Sep. 9, 2022

(65) Prior Publication Data

US 2024/0119212 A1 Apr. 11, 2024

Related U.S. Application Data

(60) Provisional application No. 63/156,213, filed on Mar. 3, 2021.

(51) Int. Cl.

| | |
|---|---|
| ***G06F 30/392*** | (2020.01) |
| ***G06F 30/398*** | (2020.01) |
| ***G06F 119/02*** | (2020.01) |

(52) U.S. Cl.
CPC .......... *G06F 30/392* (2020.01); *G06F 30/398* (2020.01); *G06F 2119/02* (2020.01)

(58) Field of Classification Search
CPC ... G06F 30/392; G06F 30/398; G06F 2119/02
(Continued)

(56) References Cited

U.S. PATENT DOCUMENTS 5,229,872 A 7/1993 Mumola
5,296,891 A 3/1994 Vogt et al.
(Continued)

FOREIGN PATENT DOCUMENTS

CN 112384860 2/2021
TW 202010995 3/2020
(Continued)

OTHER PUBLICATIONS

International Search Report and Written Opinion issued in corresponding PCT Patent Application No. PCT/EP2022/054790, dated Jun. 27, 2022.
(Continued)

*Primary Examiner* — Suresh Memula
(74) *Attorney, Agent, or Firm* — Pillsbury Winthrop Shaw Pittman LLP

(57) ABSTRACT

Methods for configuring a patterning process based on results of another patterning process is described. The method includes obtaining a first set of contours by simulating a first patterning process using a design layout in a first orientation. The contours satisfy a design specification associated with the design layout and correspond to a first set of process window conditions. A second patterning process is configured based on a second orientation of the design layout, the first set of process window conditions and the first set of contours. The second patterning process is associated with one or more design variables (e.g., illumi-
(Continued)

nation, mask pattern) that affect a second set of contours. The configuring includes adjusting one or more design variables until the second set of contours are within a desired matching threshold with the first set of contours.

20 Claims, 17 Drawing Sheets

(58) Field of Classification Search
USPC .......................................................... 716/100
See application file for complete search history.

(56) References Cited

U.S. PATENT DOCUMENTS

| | | | | |
|---|---|---|---|---|
| 5,523,193 | A | 6/1996 | Nelson | |
| 5,969,441 | A | 10/1999 | Loopstra et al. | |
| 6,046,792 | A | 4/2000 | Van Der Werf et al. | |
| 7,496,882 | B2 * | 2/2009 | Hansen | G03F 7/70425 700/121 |
| 7,587,704 | B2 | 9/2009 | Ye et al. | |
| 8,458,626 | B1 * | 6/2013 | Tirapu-Azpiroz | G03F 1/36 716/54 |
| 8,812,998 | B2 * | 8/2014 | Tao | G03F 1/70 716/54 |
| 11,544,550 | B2 | 1/2023 | Brink et al. | |
| 11,568,123 | B2 | 1/2023 | Fan et al. | |
| 11,755,814 | B2 * | 9/2023 | Chen | G03F 1/36 716/102 |
| 2005/0122501 | A1 | 6/2005 | Rosenbluth | |
| 2008/0127029 | A1 * | 5/2008 | Graur | G03F 1/36 716/54 |
| 2009/0157360 | A1 | 6/2009 | Ye et al. | |
| 2011/0004855 | A1 * | 1/2011 | Choi | G03F 1/36 716/53 |
| 2013/0179847 | A1 | 7/2013 | Hansen | |
| 2013/0326437 | A1 * | 12/2013 | Liu | G03F 1/70 716/54 |
| 2020/0356011 | A1 | 11/2020 | Su et al. | |
| 2025/0061563 | A1 * | 2/2025 | Barz | G06T 7/001 |

FOREIGN PATENT DOCUMENTS

| | | |
|---|---|---|
| TW | 202043839 | 12/2020 |
| WO | 2019/048506 | 3/2019 |
| WO | 2020/216572 | 10/2020 |

OTHER PUBLICATIONS

Office Action issued in corresponding Taiwanese Patent Application No. 111107461, dated Jun. 29, 2023.

* cited by examiner

CONFIGURATION OF PATTERNING PROCESS

CROSS-REFERENCE TO RELATED APPLICATIONS

This application is the U.S. national phase entry of PCT Patent Application No. PCT/EP2022/054790 which was filed on Feb. 25, 2022, which claims priority of U.S. Provisional Patent Application No. 63/156,213 which was filed Mar. 3, 2021, and which is incorporated herein in its entirety by reference.

TECHNICAL FIELD

The description herein relates to lithographic apparatuses and processes, and including a method or apparatus to configure a patterning process based on characteristics associated with a prior patterning process or apparatus using in semiconductor manufacturing.

BACKGROUND

A lithographic projection apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic projection apparatus, one target portion at a time. In one type of lithographic projection apparatuses, the circuit pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic projection apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, lithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1\times\lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or design layout. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

BRIEF SUMMARY

Disclosed herein is a method for improving patterning process e.g., patterning consistency between different patterning process of imaging a portion of a design layout onto a substrate using a lithographic apparatus. In an embodiment, patterning consistency is maintained between a first patterning process and a second patterning process for different orientations of a design layout used. For example, in during a patterning process using a lithographic apparatus, when a reticle (having a pattern to be printed on the substrate) is rotated by 90° with respect to a reference orientation, a source is also rotated by 90° without affecting a performance of the patterning process. However, using some lithographic apparatus (e.g., employing reflective masks), rotating both the reticle and the source by 90° may affect the performance of the lithographic process resulting in patterns on the substrate not satisfying design specifications. As such, according to the present disclosure, to achieve consistent patterning process performance, one or more design variables (e.g., source related variables, mask related variables, etc.) related to the patterning process may be modified. As such, consistent performance can be maintained between different lithographic apparatus, between different patterning processes, or between differently oriented mask patterns used in a patterning process.

According to an embodiment of the present disclosure, there is provided a method for configuring a patterning process. The method includes obtaining a first set of contours of structures on a substrate by simulating a first patterning process using a design layout in a first orientation. Each contour within the first set of contours satisfy a design specification associated with the design layout. The first set of contours correspond to a first set of process window conditions. Further, a second patterning process is configured based on a second orientation of the design layout, the first set of process window conditions and first set of contours. The second orientation being different from the first orientation. The second patterning process is characterized by values of one or more design variables that affect a second set of contours of the structures. The configuring incudes adjusting one or more design variables until the second set of contours are within a desired matching threshold with the first set of contours, the one or more design variables comprising variables associated with an illumination source of the second patterning process.

In an embodiment, the method further includes adjusting of the one or more design variables until a performance metric of the second patterning process is within acceptable limits of a first performance metric of the first patterning process. In an embodiment, the first performance metric includes, but not limited to, depth of focus associated with the first patterning process; an image contrast associated with the first patterning process; a process variation band associated with a process variable of the first patterning process, or a combination thereof.

In an embodiment, the first set of contours includes a set of simulated contours of the structures associated with the first set of process window conditions. In an embodiment, the first set of contours includes a first contour obtained using a first process window condition within the first set of process window conditions; and a second contour obtained using a second process window condition within the first set of process window conditions.

In an embodiment, the first set of process window conditions includes values of process variables related to the first patterning process, the process variables comprising at one of: dose, focus, bias, flare, aberration or a combination thereof.

In an embodiment, the design variables that are configured for the second pattern process includes one or more variables associated with: an illumination source of the lithographic apparatus; geometric properties of the design layout; projection optics of the lithographic apparatus; a resist process related parameter; a etching process related parameter, or a combination thereof.

In an embodiment, the second orientation is a predetermined rotation amount relatively to the first orientation of the design layout, the predetermined rotation amount relating to an orientation of a portion of the substrate being patterned. In an embodiment, the predetermined rotation amount is within a range 0°-360° with respect to the first orientation. In an embodiment, the second orientation of the design layout is rotated by 90° with respect to the first orientation of the design layout. In an embodiment, the one or more design variables associated with the second patterning process comprises an illumination pupil shape, the illumination pupil shape being rotated by a different amount than an illumination pupil shape associated with the first patterning process for the same design layout. In an embodiment, the first patterning process includes a first illumination pupil having a first pupil shape in the first orientation, and the second patterning process includes a second illumination pupil having a second shape different from the first illumination pupil shape, and/or an orientation different from the first orientation and second orientation.

In an embodiment, the second patterning process includes performing, via one or more process models associated with the second patterning process using the set of first process window conditions as inputs, a source optimization or a source mask co-optimization until each of the second set of contours of the second patterning process are within the desired matching threshold with each corresponding contour of the first set of contours.

In an embodiment, configuring of the second patterning process is an iterative process, each iteration including (i) simulating one or more process models associated with the second patterning process using the first set of process window conditions, the second orientation of the design layout, and the one or more design variables to generate the second set of contours; (ii) computing a multi-variate cost function using values of the design variables and simulation results; (iii) determining whether the multi-variate cost function satisfies a termination condition; (iv) determining whether each contour of the second set of contours is within the desired matching threshold of each corresponding contour of the first set of contours; and (v) responsive to the termination condition not being satisfied or the second set of contours not within the desired matching threshold, further modifying the one or more design variables and performing steps (i)-(v).

According to an embodiment, there is provided a method for configuring a patterning process of imaging a design layout onto a substrate using a lithographic apparatus. The method includes obtaining a first set of simulated characteristics related a first patterning process by simulating the first patterning process using a first configuration of design variables Each simulated characteristic of the first set of simulated characteristics satisfying a first set of constraints and each simulated characteristic being associated with a particular process window condition. Further, a second patterning process is configured based on a subset the first design variables that are configured differently than the first configuration the second patterning process being associated with a second set design variables that affect a second set of contours of the structures. The configuring includes adjusting the second set of design variables until the second set of simulated characteristics are within a desired matching threshold with the first set of simulated characteristics, each of the second set of simulated characteristics being compared with each corresponding first set of simulated characteristics per process window condition.

In an embodiment, the simulated characteristics includes simulated contours to be printed on the substrate using the design layout; an aerial image associated with the design layout; a resist image associated with the design layout; or an etch image associated with the design layout. In an embodiment, the first set of constraints includes design specifications, or model error distribution associated with one or more model of a patterning process.

In an embodiment, the first patterning process is associated with a first lithographic apparatus (e.g., DUV), and the second patterning process is associated with a second lithographic apparatus (e.g., EUV).

According to an embodiment, there is provided a method for configuring a patterning process. The method includes computing a first multi-variate cost function using a first set of design variables associated with a first patterning process, the first set of design variables characterizing a first illumination source, a design layout, and a first process window conditions, reconfiguring the first patterning process by adjusting the first set of design variables until a termination condition related to design specifications is satisfied to obtain a first set of simulation characteristics, computing a second multi-variate cost function using a second set of design variables associated with a second patterning process, the second set of design variables characterizing a second illumination source, and the design layout, and reconfiguring, using the first process window conditions, the second patterning process by adjusting the second set of design variables until a second set of simulation characteristics are within a desired matching threshold of the first set of simulation characteristics.

In an embodiment, upon configuring the second patterning process, the second set of design variables comprises at least one of: a second orientation of the design layout used in the second patterning process, the second orientation being different from the first orientation; a second source variables characterizing the second source to be used in the second patterning process, the second source being different from the first source; a second mask pattern to be used in the second patterning process; a second resist parameters to be used in the second patterning process; a second etch parameters to be used in the second patterning process; or a second aberrations associated with a lithographic apparatus used in the second patterning process.

In an embodiment, the first patterning process is associated with a first lithographic apparatus (e.g., DUV), and the second patterning process is associated with a second lithographic apparatus (e.g., EUV).

In an embodiment, the first simulated characteristics includes, but not limited to, simulated contours to be printed on the substrate using the design layout; an aerial image associated with the design layout; a resist image associated with the design layout; an etch image associated with the design layout; or a combination thereof.

In an embodiment, the first or the second multi-variate cost function comprises at least one of: edge placement error of a second set of contours with respect to the first set of contours, pattern placement error associated with the second set of contours, critical dimension (CD) of the second set of contours, a local CD uniformity of the second set of contours, an image contrast of an image associated with the second patterning process, resist contour distance, worst defect size, best focus shift, or mask rule check.

According to an embodiment, there is provided a non-transitory computer-readable medium for improving a lithographic process of imaging a portion of a design layout onto a substrate using a lithographic apparatus, the medium comprising instructions stored therein that, when executed by one or more processors, cause operations including steps of the method herein.

DETAILED DESCRIPTION

Figure 1:
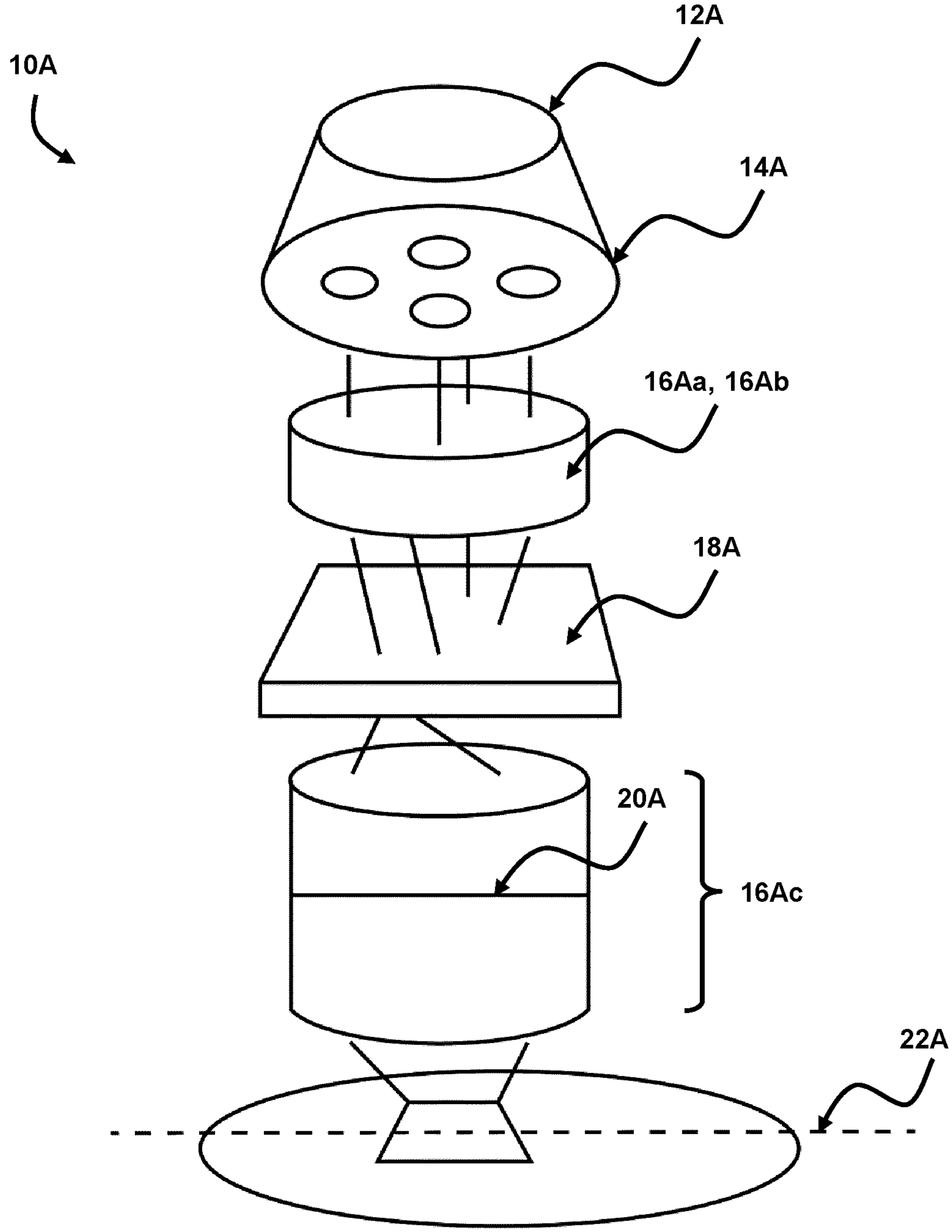
FIG. 1 is a block diagram of various subsystems of a lithography system, according to an embodiment, of the present disclosure.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "optimizing" and "optimization" as used herein refers to or means adjusting a lithographic projection apparatus, a lithographic process, etc. such that results and/or processes of lithography have more desirable characteristics, such as higher accuracy of projection of a design layout on a substrate, a larger process window, etc. Thus, the term "optimizing" and "optimization" as used herein refers to or means a process that identifies one or more values for one or more parameters that provide an improvement, e.g. a local optimum, in at least one relevant metric, compared to an initial set of one or more values for those one or more parameters. "Optimum" and other related terms should be construed accordingly. In an embodiment, optimization steps can be applied iteratively to provide further improvements in one or more metrics.

Further, the lithographic projection apparatus may be of a type having two or more tables (e.g., two or more substrate table, a substrate table and a measurement table, two or more patterning device tables, etc.). In such "multiple stage" devices a plurality of the multiple tables may be used in parallel, or preparatory steps may be carried out on one or more tables while one or more other tables are being used for exposures. Twin stage lithographic projection apparatuses are described, for example, in U.S. Pat. No. 5,969,441, incorporated herein by reference.

The patterning device referred to above comprises, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. One or more of the design rule limitations may be referred to as "critical dimensions" (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

- a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. More information on such mirror arrays can be gleaned, for example, from U.S. Pat. Nos. 5,296,891 and 5,523,193, which are incorporated herein by reference.
- a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which define the partial coherence (denoted as sigma) and which may include optics 14A, 16Aa and 16Ab that shape radiation from the source 12A; a patterning device 14A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin ($\Theta_{max}$), n is the Index of Refraction of the media between the last element of projection optics and the substrate, and $\Theta_{max}$ is the largest angle of the beam exiting from the projection optics that can still impinge on the substrate plane 22A. The radiation from the radiation source 12A may not necessarily be at a single wavelength. Instead, the radiation may be at a range of different wavelengths. The range of different wavelengths may be characterized by a quantity called "imaging bandwidth," "source bandwidth" or simply "bandwidth," which are used interchangeably herein. A small bandwidth may reduce the chromatic aberration and associated focus errors of the downstream components, including the optics (e.g., optics 14A, 16Aa and 16Ab) in the source, the patterning device and the projection optics. However, that does not necessarily lead to a rule that the bandwidth should never be enlarged.

In an optimization process of a system, a figure of merit of the system can be represented as a cost function. The optimization process boils down to a process of finding a set of parameters (design variables) of the system that optimizes (e.g., minimizes or maximizes) the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations (i.e., worst deviation). The term "evaluation points" herein should be interpreted broadly to include any characteristics of the system. The design variables of the system can be confined to finite ranges and/or be interdependent due to practicalities of implementations of the system. In the case of a lithographic projection apparatus, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus.

In a lithographic projection apparatus, a source provides illumination (i.e. radiation) to a patterning device and projection optics direct and shape the illumination, via the patterning device, onto a substrate. The term "projection optics" is broadly defined here to include any optical component that may alter the wavefront of the radiation beam. For example, projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the source and the projection optics.

Figure 2:
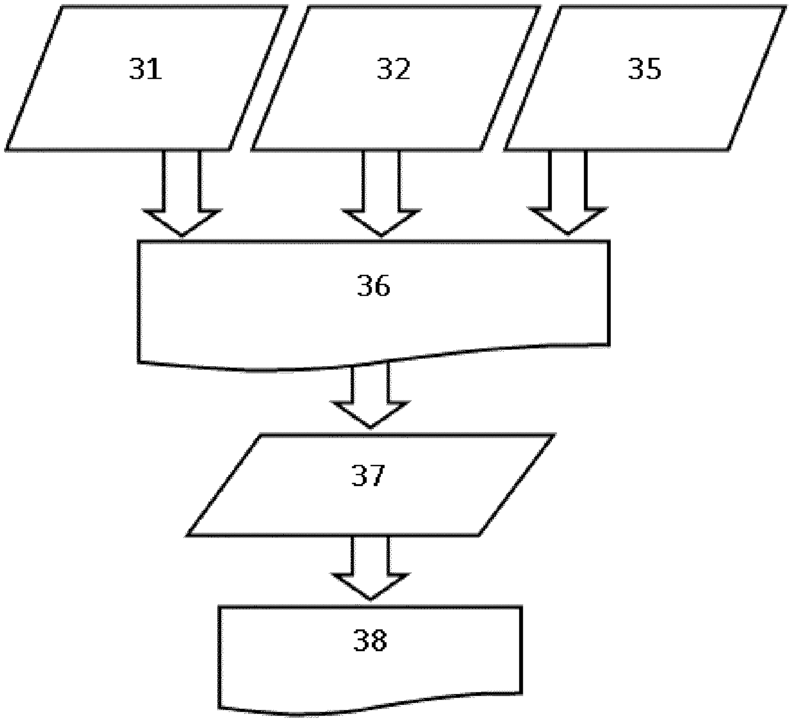
FIG. 2 is a block diagram of simulation models corresponding to the subsystems in FIG. 1, according to an embodiment, of the present disclosure.

An exemplary flow chart for simulating lithography in a lithographic projection apparatus is illustrated in FIG. 2. A source model 31 represents optical characteristics (including radiation intensity distribution, bandwidth and/or phase distribution) of the source. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout 33) of a design layout, which is the representation of an arrangement of features on or formed by a patterning device. An aerial image 36 can be simulated from the design layout model 35, the projection optics model 32 and the design layout model 35. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, numerical aperture settings, illumination sigma (G) settings as well as any particular illumination shape (e.g. off-axis radiation sources such as annular, quadrupole, dipole, etc.). The projection optics model 32 can represent the optical characteristics of the projection optics, including aberration, distortion, one or more refractive indexes, one or more physical sizes, one or more physical dimensions, etc. The design layout model 35 can represent one or more physical properties of a physical patterning device, as described, for example, in U.S. Pat. No. 7,587,704, which is incorporated by reference in its entirety. The objective of the simulation is to accurately predict, for example, edge placement, aerial image intensity slope and/or CD, which can then be compared against an intended design. The intended design is generally defined as a pre-OPC design layout which can be provided in a standardized digital file format such as GDSII or OASIS or other file format.

From this design layout, one or more portions may be identified, which are referred to as "clips". In an embodiment, a set of clips is extracted, which represents the complicated patterns in the design layout (typically about 50 to 1000 clips, although any number of clips may be used). These patterns or clips represent small portions (i.e. circuits, cells or patterns) of the design and more specifically, the clips typically represent small portions for which particular attention and/or verification is needed. In other words, clips may be the portions of the design layout, or may be similar or have a similar behavior of portions of the design layout, where one or more critical features are identified either by experience (including clips provided by a customer), by trial and error, or by running a full-chip simulation. Clips may contain one or more test patterns or gauge patterns.

An initial larger set of clips may be provided a priori by a customer based on one or more known critical feature areas in a design layout which require particular image optimization. Alternatively, in another embodiment, an initial larger set of clips may be extracted from the entire design layout by using some kind of automated (such as machine vision) or manual algorithm that identifies the one or more critical feature areas.

In a semiconductor manufacturing process, different patterning apparatuses, different patterning processes, or both may be employed to print a desired circuit pattern (e.g., a design layout or a portion thereof). However, often patterning consistency may be affected due to changes in configuration between different apparatuses or processes. FIGS. 3, 4A-4B, and 5 illustrates example problems associated with maintaining patterning consistency. It can be understood that the patterning consistency is discussed with respect to changes in orientation of a design layout or a corresponding mask pattern, as an example. However, methods discussed herein are not limited to such changes in orientation. According to the present disclosure, a first patterning process may be configured to include a first configuration of a first set of design variables (e.g., source, design layout orientation, mask, etc.) for printing a design layout (or a portion thereof) on a first portion of a substrate. To maintain patterning consistency in a second patterning process, a second configuration of a second set of design variables may be employed, where the second configuration is based on characteristics of the first patterning process.

Figure 3:
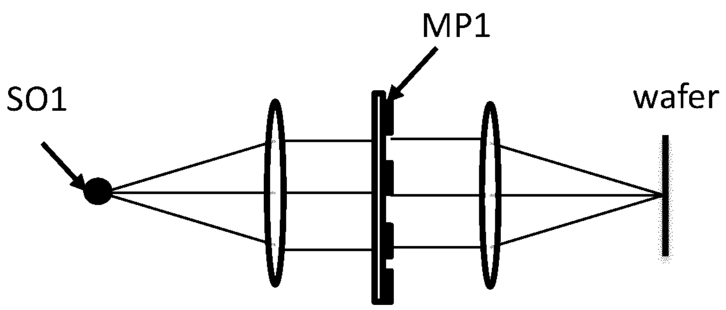
FIG. 3 is a schematic ray diagram of a lithographic apparatus showing illumination of a wafer though a transmission-type reticle to print or image the mask pattern onto a substrate, according to an embodiment of the present disclosure.

FIG. 3 is a schematic ray diagram of a lithographic apparatus showing illumination of a wafer though a transmission-type reticle (e.g., having a mask pattern MP1) to print or image the mask pattern MP1 onto the substrate. The rays illuminating the reticle MP1 are substantially collinear and incident perpendicular to the reticle MP1. For productivity improvements, different portions of a substrate or different substrates may be patterned with different orientations of the reticle MP1 for better area efficiency. For example, in a first patterning process the reticle MP1 may be in an initial or a first orientation, while in a second patterning process the reticle MP1 may be rotated by a certain angle e.g., 90 degree with respect to the initial or the first orientation. In DUV lithography, for example, rotating the reticle MP1 and a pupil of an illumination source by 90 degree does not cause problems with pattering performance since the illumination is substantially perpendicular to the reticle MP1 and lead angle between the rays is approximately zero. In other words, when transmission type reticle is used, a performance of the first patterning process and the second patterning process remain consistent when both the reticle and the source are rotated by same amount. For example, a first set of contours of features printed on the wafer by the first patterning process using the reticle MP1 in the first orientation, and a second set of contours printed by the second patterning process both have contours closely matching a design layout. In other words, a difference between the first set of contours and corresponding contours of the design layout (e.g., GDS file) in a first orientation is within desired limits (e.g., within desired EPE or CD limits) Similarly, a difference between the second set of contours and a rotated design layout (e.g., rotated by 90 degrees with respect to the first orientation) is within desired limits (e.g., within desired EPE or CD limits).

Figure 4A:
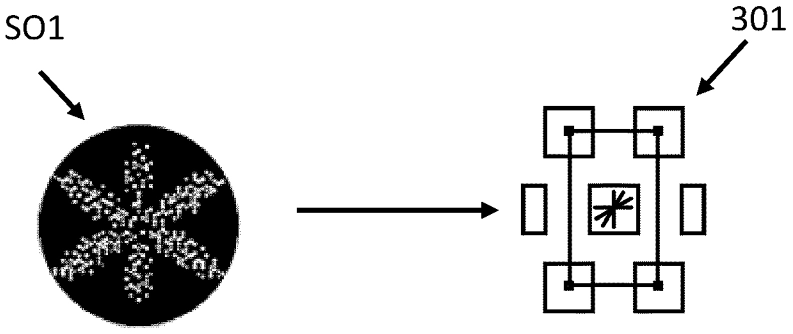
FIG. 4A illustrates an example illumination source having a shape and orientation of a pupil that corresponds to a design layout in a first orientation, according to an embodiment of the present disclosure.

In FIG. 3, the lithographic apparatus (e.g., DUV) includes the source SO1 having a predetermined orientation and shape configured to illuminate the reticle MA1. The source SO1 may be determined by simulating one or more models of a patterning process using a design layout in a first orientation. FIG. 4A illustrates an example illumination source having a shape and orientation of a pupil that corresponds to a design layout 301 in a first orientation. The design layout 301 represents only a portion of the design layout for illustration purposes. The reticle MP1 includes a mask pattern corresponding to the design layout 301, where the mask pattern includes patterns corresponding to the design layout as well as assist features (e.g., SRAF). In an embodiment, the mask patterns and characteristics of the source SO1 may be determined using a source mask optimization, mask optimization or other mask pattern determination processes such as resolution enhancement techniques. For example, as shown in FIG. 4A, a pupil shape is characterized by a star-shaped pattern (indicated by white or brighter spots), each petal of the star-shape may have different intensity values, and size. In an embodiment, the sizes of the petals may be substantially the same.

Figure 4B:
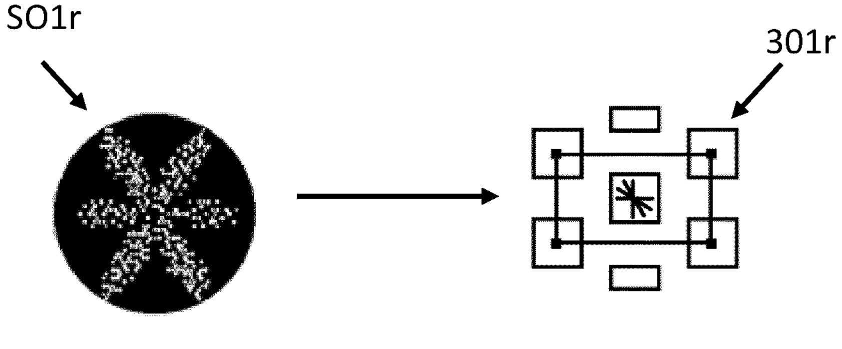
FIG. 4B illustrate a rotated illumination source (e.g., rotated version of FIG. 4A) that can be employed with a rotated design layout to print or image the mask pattern MP1 onto the substrate, according to an embodiment of the present disclosure.

FIG. 4B illustrate a rotated illumination source SO1*r* that can be employed with a rotated design layout 301*r* to print or image the mask pattern MP1 onto the substrate. The rotated design layout 301*r* is a 90 degree rotated version of the design layout 301. Accordingly, the design layout features (e.g., contact holes, lines, etc.) remain same, expect being rotated by 90 degrees with respect to a first orientation (e.g., of FIG. 4A). Note that the characteristics of the rotated illumination source SO1*r* remain substantially the same as the illumination source SO1 (in FIG. 4A), except that the rotated illumination source SO1*r* is rotated by 90 degrees with respect to the illumination source SO1. In other words, typically additional process simulations may not be performed when the design layout 301 is rotated e.g., by 90 degrees or any other angle.

Thus, when printing a design layout in a rotated orientation, additional changes to characteristics of the lithographic apparatus or a lithographic process (e.g., in DUV) may not be necessary. As such, when using rotated version of the design layout, characteristics of the source, mask, etc. remain substantially same as characteristics associated with an un-rotated design layout. However, when using some lithographic apparatus (e.g., EUV) in a patterning process, rotating a design layout necessitates configuring or reconfiguring another patterning process to accommodate rotation of the design layout so that the performance of the patterning process remains consistent.

Figure 5:
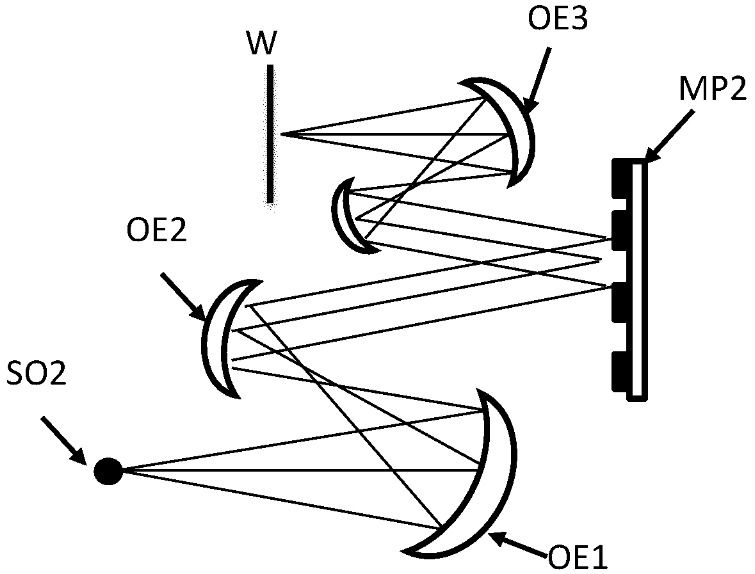
FIG. 5 is a schematic ray diagram showing an illumination of a wafer via a reflective-type reticle to print or image the mask pattern MP1 onto the substrate, according to an embodiment of the present disclosure.

FIG. 5 is a schematic ray diagram showing an illumination of a wafer via a reflective-type reticle (e.g., having a mask pattern MP2) to print or image the mask pattern MP1 onto the substrate. In an embodiment, such reflective type reticle may be employed in a EUV apparatus. As shown, light from a source SO2 is reflected from different optical elements OE1, and OE2 at different oblique chief ray angles creating oblique rays. The oblique rays are incident on a reflective reticle (e.g., having a mask pattern MP2) at an angle with respect to a surface of the reticle, as opposed to being incident perpendicular. Further, the oblique rays from the reticle MP2 are further reflected by optical elements such as OE3 before being incident on the substrate W. As such, a simple pupil rotation may not work in EUV apparatus when a design layout is rotated because oblique rays create asymmetry between a source pupil and the reticle. In addition, an imaging asymmetry by pattern rotation may be created on to the substrate due to 3D mask effect. In an embodiment, light may be reflected from different portions of the 3D structures of a mask pattern in rotated position and not rotated position. For example, upon rotation, light previously reflected from a vertical pattern is now reflected from a horizontal pattern, resulting in very different patterning performance.

Existing procedure for performance consistency between rotated and not rotated design layout includes determining a first source (e.g., via SMO), and check source performance such as depth of focus (DOF), normalized image log slope (NILS), process variation (PV) band characterized by contours obtained from varying different process variables of the patterning process. Then, rotate the design layout (e.g., by 90-degree) and determining a second source (e.g., via a second SMO run). Initial pupil (for the second SMO run) may or may not be the rotated pupil (e.g., 90-degree rotated) from the first SMO. In the second SMO run, the second source performance (e.g., characterized by DOF, NILS) is compared with the first source performance from the first SMO. In the second SMO run, the design variables of a source or a mask may be varied until DOF, NILS, PV band are matched with the first SMO.

However, using existing methods, matching source performance (e.g., DOF) is not a trivial matter. For example, DOF is a comprehensive outcome based on various inputs (such as input PW axes, input PW magnitude, input layouts, etc.), but it is difficult to pinpoint a correlation from multiple input to an output (e.g., performance DOF). As such, ensuring performance consistency after changing a configuration of design variables, e.g., rotating a design layout or a corresponding mask is difficult.

The present disclosure provides method, apparatus, and system, configured to improve consistency between different patterning processes. For example, the methods herein can minimize lithography process performance differences between a first source obtained by a first source mask optimization (SMO) process and a second source obtained from a second SMO (e.g., SMO with 90 degree rotated design layout). By improving performance consistency, effort to update optical proximity correction (OPC) models, OPC recipes, and validation of a mask pattern with rotated design layout (e.g., 90-degree) will be minimal. It can be understood that the rotation amount of 90 degrees is presented by way of example, and other rotation amounts may be used as well.

According to the present disclosure, simulation characteristics (e.g., a set of contours) from a first simulation of the patterning process (e.g., including SMO) are generated and the results (e.g., a set of contours) are rotated by a second orientation amount (e.g., by 90-degree) and stored for use in subsequent patterning process. In an embodiment, a source and a mask pattern (e.g., including SRAF if any) from a first patterning process simulation (e.g., SMO) is stored. In an embodiment, a set of contours for each individual process window condition are stored. For example, the process window conditions may be characterized by values of process variables or lithography related parameters such as focus, dose, mask bias, flare, aberration, etc. or a combination of them. In an embodiment, the set of contours include an inner contour associated with a first extreme PW condition (e.g., a negative dose value −d) and an outer contour associated with a second extreme PW condition (e.g., a positive dose value +d). In an embodiment, the inner and the outer contours are specified with reference to a corresponding contour of a design layout. For example, if a contour is smaller than a design layout contour, then it may be referred as an inner contour, as it would be located inside the design layout contour, and if a contour is larger or equal to the size (e.g., CD) of the contour, then it may be referred as outer contour as it would be located on top of the design contour or full or partially outside the design contour. An example implementation of a method for configuring the second patterning process is further discussed in detail with respect to FIG. 7.

Figure 6A:
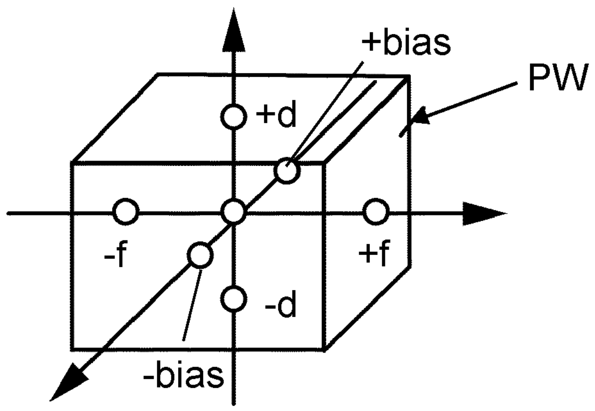
FIG. 6A pictorially depicts example process window conditions used in a first patterning process for determining a characteristic of a first patterning process, according to an embodiment of the present disclosure.
Figure 6B:
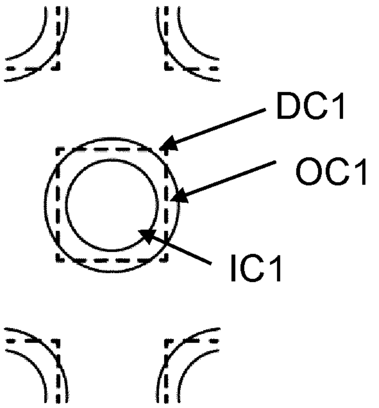
FIG. 6B illustrates example contours generated using a design layout and process window conditions (e.g., dose of FIG. 6A), according to an embodiment of the present disclosure.
Figure 6C:
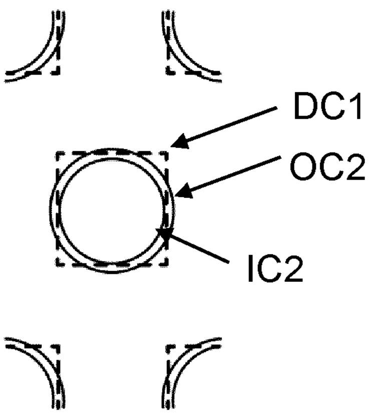
FIG. 6C illustrates example contours generated using a design layout and process window conditions (e.g., bias of FIG. 6A), according to an embodiment of the present disclosure.

FIG. 6A pictorially depicts example process window conditions PW used in a first patterning process (e.g., including SMO) for determining a characteristic (e.g., a source) of a first patterning process. The process conditions include a first dose value (+d), a second dose value (−d), a first focus value (−f), a second focus value (+f), a first mask bias (−bias), and a second mask bias value (+bias). FIGS. 6B and 6C illustrates example contours generated using a design layout and process window conditions related to dose. In FIG. 6B, a design contour DC1 represents a contour of the design layout, an inner contour IC1 correspond to a contour produced on a substrate using dose +d, and an outer contour OC1 correspond to a contour produced on a substrate using dose −d. In FIG. 6C, an inner contour IC2 correspond to a contour produced on a substrate using mask bias −bias, and an outer contour OC2 correspond to a contour produced on a substrate using mask bias +bias.

Figure 7:
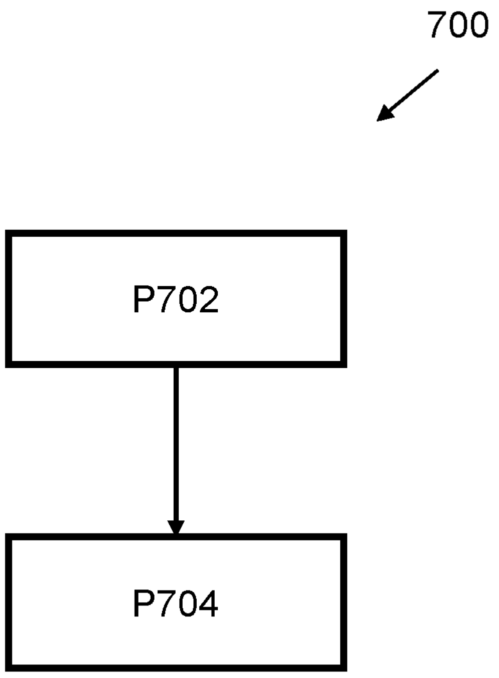
FIG. 7 is a flow diagram of a method for improving a lithographic process, according to an embodiment of the present disclosure.

FIG. 7 is a flow chart of a method 700 for improving a patterning process of imaging a design layout or a portion thereof onto a substrate using a lithographic apparatus. In an embodiment, an improving of the patterning process comprises improving patterning consistency of a particular pattern that is imaged using different patterning process or patterning apparatuses. In an embodiment, the method 700 includes processes P702 and P704 further discussed in detail below.

Process P702 includes obtaining a first set of simulated characteristics related a first patterning process by simulating models associated with the first patterning process using a first configuration of design variables. For example, the simulated characteristic may be an aerial image of a design layout, a resist image associated with the design layout, an etch image associated with the design layout, contours of structures that may be printed on the substrate, or other characteristics that may be simulated using one or more model of the patterning process.

In an embodiment, each simulated characteristic of the first set of simulated characteristics satisfy a first set of constraints (e.g., design specification, error specification, etc.) and each simulated characteristic is associated with a particular process window condition. In an embodiment, a simulated characteristic may be a simulated contour at substrate-level obtained using a particular process window condition.

In an embodiment, the process P702 includes obtaining a first set of contours of structures that may be formed on a substrate. In an embodiment, the first set of contours of the structures may be obtained by simulating the first patterning process using the design layout in a first orientation. Each contour within the first set of contours satisfies a design specification associated with the design layout. The first set of contours correspond to a first set of process window conditions. In an embodiment, the first set of process window conditions includes, but not limited to, values of process variables related to the first patterning process. For example, the process variables may be dose, focus, bias, flare, aberration or a combination thereof.

In an embodiment, the first set of contours includes a set of simulated contours of the structures obtained using the first set of process window conditions. For example, a first contour may be obtained using a first process window condition (e.g., positive extreme dose value) within the first set of process window conditions, a second contour may be obtained using a second process window condition (e.g., a negative extreme dose value) within the first set of process window conditions, a third contour may be obtained using a third process window condition (e.g., positive bias value), a fourth contour may be obtained using a fourth process window condition (e.g., negative bias value), and so on. Examples of a first set of contours are discussed with respect to FIGS. 6B and 6C using the first set of process window conditions (e.g., in FIG. 6A).

In an embodiment, the first set of contours may be obtained by simulating the first patterning process guided by a cost function and one or more constraints related to design specifications. In an embodiment, the simulation of the patterning process includes computing a multi-variable cost function CF which is a function of a plurality of design variables (e.g., $z_1, z_2, \ldots, z_N$) that affect characteristics of the lithographic process. In an embodiment, the cost function CF may be represented as equation 1 or other cost function equations discussed herein. Examples of the cost function computation are described throughout the present disclosure. In an embodiment, the cost function comprises one or more terms that are characteristic of a patterning process, performance of the patterning process, or other aspects related to the patterning process. In an embodiment, the cost function includes one or more terms selected from the following: edge placement error (EPE) between the first set of contours and corresponding design contours of the design layout, pattern placement error (PPE) between the first set of contours and corresponding design contours, critical dimension (CD) of the first set of contours, a local CD uniformity of the first set of contours, resist contour distance, worst defect size, best focus shift, or mask rule check. The configuration of the plurality of design variables affects EPE, CD, PPE, LCDU, etc. and consequently the cost function. As such, using the cost function as a guide, configuration (e.g., values) of one or more design variables may be determined to satisfy the desired constraints.

In an embodiment, the design variables includes, but not limited to, one or more variables associated with: an illumination (e.g., intensity, pupil shape, etc.) of the lithographic apparatus; geometric properties (e.g., shape, size, etc.) of the design layout; projection optics of the lithographic apparatus; or a resist (e.g., resist thickness, type of resist, etc.) of the substrate, and the etch properties (etch bias) of the substrate. Additional examples of the design variables are described throughout the specification. For example, design variables that may be adjusted during different processes such as SO and SMO are discussed with respect to FIGS. 10-13.

Accordingly, the first set of design variables may include, but not limited to, a first orientation of the design layout to be used in the first patterning process; a first source variables characterizing a first source to be used in the first patterning process; a first mask pattern to be used in the first patterning process; a first resist parameters to be used in the first patterning process; a first etch parameters to be used in the first patterning process; a first aberrations associated with a lithographic apparatus used in the first patterning process, or other variables discussed herein.

Figure 8:
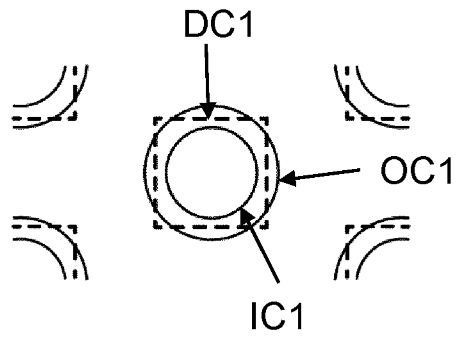
FIG. 8 illustrates rotated contours of a first set of contours obtained using a first patterning process at extreme dose conditions, according to an embodiment of the present disclosure.

FIG. 8 illustrates examples of simulated characteristics of the first patterning process obtained using a first PW condition (e.g., a first dose value such as +30 units) and a second PW condition (e.g., a second dose value such as −30 units). In an example, the simulated characteristics may be simulated contours. In FIG. 8, a first contour IC1 correspond to a design contour DC1 of a design layout obtained using the first PW condition, and a second contour OC1 correspond to a design contour DC1 of a design layout obtained using the second PW condition. Similarly, a third contour may be obtained using a third PW condition (e.g., +focus value), a fourth contour may be obtained using a fourth PW condition (e.g., −mask bias value), a fifth contour may be obtained using a fifth PW condition (e.g., +bias value), and so on.

In the example shown in FIG. 8, the design contours DC1 of the design layout are rotated by 90 degree, accordingly, the simulated contours OC1 and IC1 are also rotated by 90 degree. These rotated contours may be used to configure the second patterning process, as discussed below with respect to FIGS. 9A and 9B. In one example, the rotated contours OC1 and IC1 are used as target contours for configuring the second patterning process. In another example, the rotated contours OC1 and IC1 are used as constraints within which a contour of the second patterning process should lie.

Figure 9A:
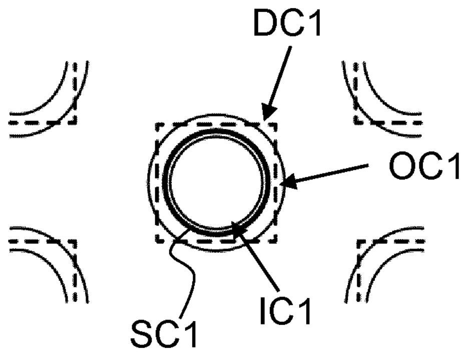
FIG. 9A illustrates use of the first set of contours of FIG. 8 as target to be matched when configuring the second patterning process, according to an embodiment of the present disclosure.

FIG. 9A illustrates how a first set of simulated characteristics associated with the first patterning process can be used to configure the second patterning process. For example, the contours e.g., comprising the outer contour OC1 and the inner contour IC1 obtained using extreme dose values can be used to configure a second set of design variables for a second patterning process. As shown in FIG. 9A, the first set of contours (e.g., OC1 and IC1) may be used as target contours to be matched by the second patterning process. In an embodiment, a second set of design variables may be adjusted to cause a simulated contour SC1 of the second patterning process to closely match the target contour IC1. In an embodiment, the adjusting of the design variables comprises adjusting variables related to a source, mask, resist process, other design variables, or a combination of design variables.

In an example, configuring the second patterning process includes using the first PW condition (e.g., +dose) as input and adjusting a design variable (e.g., illumination pupil intensity) to causes the simulated contour SC1 to closely match the inner contour IC1. Similarly, configuring the second patterning process may further comprises using the second PW condition (e.g., −dose) as input and adjusting a design variable (e.g., illumination pupil intensity) to causes another simulated contour (not shown) to closely match the outer contour OC1. Accordingly, for each PW condition of the first patterning process, second simulated characteristics (e.g., simulated contour) of the second patterning process closely matches the first simulated characteristics (e.g., simulated contour) of the first patterning process.

Figure 9B:
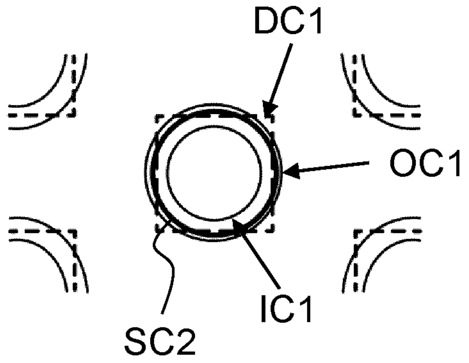
FIG. 9B illustrates use of the first set of contours of FIG. 8 as constraints to be satisfied when configuring the second patterning process, according to an embodiment of the present disclosure.

FIG. 9B illustrates use of the inner contour IC1 and the outer contour OC1 of the first patterning process as constraints for configuring the second patterning process. For example, a second set of design variables may be adjusted to cause a size and shape of a simulated contour SC2 associated with the second patterning process to be within a region between the inner contour IC1 and the outer contour OC1. The configuration of the second patterning process is further discussed in detail with respect to process P704 below.

Process P704 includes configuring a second patterning process based on a subset the first design variables that are configured differently than the first configuration, while other design variables may remain same as the first patterning process. For example, the design layout, source, resist, or other design variables may be configured differently than in the first patterning process, while keeping the dose, focus or other variable same as the first patterning process. In an embodiment, the second patterning process is associated with a second set design variables that affect a second set of contours of the structures. The configuration of the second set of variables may be different from the configuration of the first set of design variables. The configuration of the second set of design variables, however is guided by results of the first patterning process.

In an embodiment, configuring the second patterning process involves adjusting the second set of design variables until the second set of simulated characteristics are within a desired matching threshold with the first set of simulated characteristics, each of the second set of simulated characteristics being compared with each corresponding first set of simulated characteristics per process window condition.

As an example, configuring of the second patterning process may be based on a second orientation of the design layout, the first set of process window conditions and first set of contours. The second orientation is different from the first orientation. In an embodiment, the configuring includes adjusting the second set of design variables until the second set of contours are within a desired matching threshold with the first set of contours. In an embodiment, the second set of design variables includes, but not limited to, variables associated with an illumination source of the second patterning process. In an embodiment, the desired matching threshold is more than 90% matching of each contour of the second set of contours with each corresponding contour of the first set of contours. In an embodiment, satisfying the desired matching threshold comprises maintaining each contour of the second set of contours within a first contour and a second contour of the first set of contours, the first contour and the second contour being associated with the same process variable having a first extreme value and a second extreme value, respectively.

In an example configuration of the second patterning process, the design layout may be rotated to a second orientation. For example, a rotation of a mask (corresponding to the design layout) may be desired when used in an EUV apparatus to print a mask pattern (corresponding to a design pattern of the design layout) on a different portion of a substrate or on a different substrate. In an embodiment, the second orientation is a predetermined rotation amount relatively to the first orientation of the design layout, the predetermined rotation amount relating to an orientation of a portion of the substrate being patterned. In an embodiment, the predetermined rotation amount is within a range more than 0° and less than 360° with respect to the first orientation. More particularly, the second orientation of the design layout may be rotated by approximately 90° with respect to the first orientation of the design layout.

In an embodiment, the second set of design variables associated with the second patterning process includes, but not limited to, an illumination pupil shape, the illumination pupil shape being rotated by a different amount than an illumination pupil shape associated with the first patterning process for the same design layout. As mentioned earlier, as an example, the first patterning process includes a first illumination pupil having a first pupil shape in the first orientation, while after adjusting the second set of variables, the second patterning process includes a second illumination pupil having a second shape different from the first illumination pupil shape, an orientation different from the first orientation and second orientation, or other different pupil characteristic compared to the first illumination pupil.

In an embodiment, the adjusting of the second set of design variables is performed until a performance metric of the second patterning process is within acceptable limits of a first performance metric of the first patterning process. For example, the first performance metric includes, but not limited to, depth of focus (DOF) associated with the first patterning process; an image contrast (e.g., NILS) associated with the first patterning process; and/or a process variation (PV) band associated with a process variable of the first patterning process.

Upon adjusting the second set of design variables, the variables have different values compared to the first set of design variables. For example, the second set of variables with different values than first set of design variables may include, but not limited to, the second orientation of the design layout to be used in the second patterning process; a second source variables characterizing a second source to be used in the second patterning process; a second mask pattern to be used in the second patterning process; a second resist parameters to be used in the second patterning process; a second etch parameters to be used in the second patterning process; a second aberrations associated with a lithographic apparatus (e.g., EUV) used in the second patterning process, or other variables discussed herein.

In an embodiment, configuring the second patterning process includes performing, via one or more process models associated with the second patterning process using the set of first process window conditions as inputs, a source optimization until each of the second set of contours of the second patterning process are within the desired matching threshold with each corresponding contour of the first set of contours.

In an embodiment, configuring the second patterning process includes performing, via one or more process models associated with the second patterning process using the set of first process window conditions as inputs, a source mask co-optimization until each of the second set of contours of the second patterning process are within the desired matching threshold with each corresponding contour of the first set of contours.

In an embodiment, configuring the second patterning process is an iterative process. Each iteration may include following steps: (i) simulating one or more process models associated with the second patterning process using the first set of process window conditions, the second orientation of the design layout, and the one or more design variables to generate the second set of contours; (ii) computing a multi-variate cost function using values of the design variables and simulation results; (iii) determining whether the multi-variate cost function satisfies a termination condition; (iv) determining whether each contour of the second set of contours is within the desired matching threshold of each corresponding contour of the first set of contours; and (v) responsive to the termination condition not being satisfied or the second set of contours not within the desired matching threshold, further modifying the one or more design variables and performing steps (i)-(v).

In an embodiment, for configuring the second patterning process, a multi-variate cost function may be computed to guide the adjustment of the second set of design variables. For example, the multi-variate cost function include at least one of: edge placement error between a first set of contours and corresponding second set of contours, pattern placement error between the second set of contours and the first set of contours, critical dimension (CD) of the second set of contours, a local CD uniformity of the second set of contours, an image contrast of an image associated with the second patterning process, resist contour distance, worst defect size, best focus shift, or mask rule check.

In an embodiment, for configuring the second patterning process, the termination condition may include at least one of: minimization of the cost function; maximization of the cost function; reaching a certain number of iterations; reaching a value of the cost function equal to or beyond a certain threshold value; reaching a certain computation time; reaching a value of the cost function within an acceptable error limit; or minimizing an exposure time in a lithographic process.

In an embodiment, during the configuration of the second patterning process, the cost function may be minimized or maximized by processing the cost function with an algorithm selected from a group consisting of the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.

In some embodiment, another variation of a method for configuring a patterning process may be implemented to include following operations. For example, the method includes computing a first multi-variate cost function using a first set of design variables associated with a first patterning process, the first set of design variables characterizing a first illumination source, a design layout, and a first process window conditions, reconfiguring the first patterning process by adjusting the first set of design variables until a termination condition related to design specifications is satisfied to obtain a first set of simulation characteristics, computing a second multi-variate cost function using a second set of design variables associated with a second patterning process, the second set of design variables characterizing a second illumination source, and the design layout, and reconfiguring, using the first process window conditions, the second patterning process by adjusting the second set of design variables until a second set of simulation characteristics are within a desired matching threshold of the first set of simulation characteristics.

As discussed herein, in some embodiments, the first of design variables comprises at least one of: a first orientation of a design layout to be used in the first patterning process; a first source variables characterizing the first source to be used in the first patterning process; a first mask pattern to be used in the first patterning process; a first resist parameters to be used in the first patterning process; a first etch parameters to be used in the first patterning process; or a first aberrations associated with a lithographic apparatus used in the first patterning process.

As discussed herein, in some embodiments, wherein upon configuring the second patterning process, the second set of design variables comprises at least one of: a second orientation of the design layout used in the second patterning process, the second orientation being different from the first orientation; a second source variables characterizing the second source to be used in the second patterning process, the second source being different from the first source; a second mask pattern to be used in the second patterning process; a second resist parameters to be used in the second patterning process; a second etch parameters to be used in the second patterning process; or a second aberrations associated with a lithographic apparatus used in the second patterning process.

As discussed herein, in some embodiments, the first set of constraints comprises: design specifications, or model error distribution associated with one or more model of a patterning process.

As discussed herein, in some embodiments, the first simulated characteristics comprises: simulated contours of the features to be printed on the substrate using the design layout; an aerial image associated with the design layout; a resist image associated with the design layout; or an etch image associated with the design layout.

As discussed herein, in some embodiments, the first multi-variate cost function comprises at least one of: edge placement error of a first set of contours with respect to corresponding design contours of the design layout, pattern placement error associated with the first set of contours, critical dimension (CD) of the first set of contours, a local CD uniformity of the first set of contours, an image contrast of an image associated with the first patterning process, resist contour distance, worst defect size, best focus shift, or mask rule check.

As discussed herein, in some embodiments, the second multi-variate cost function comprises at least one of: edge placement error of a second set of contours with respect to the first set of contours, pattern placement error associated with the second set of contours, critical dimension (CD) of the second set of contours, a local CD uniformity of the second set of contours, an image contrast of an image associated with the second patterning process, resist contour distance, worst defect size, best focus shift, or mask rule check.

As discussed herein, in some embodiments, the termination condition comprises at least one of: minimization of the first or the second multi-variate cost function; maximization of the cost function; reaching a certain number of iterations; reaching a value of the cost function equal to or beyond a certain threshold value; reaching a certain computation time; reaching a value of the cost function within an acceptable error limit; or minimizing an exposure time in a lithographic process.

As discussed herein, in some embodiments, the first or the second multi-variate cost function is minimized or maximized by a processing the cost function with an algorithm selected from a group consisting of the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.

According to present disclosure, the combination and sub-combinations of disclosed elements constitute separate embodiments. For example, a first combination includes obtaining a first set of contours, and configuring a second patterning process based on the first set of contours to cause a second set of contours to match the corresponding first set of contours. The sub-combination may include the first set of contours obtained using a first orientation of the design layout and the second set of contours obtained using a second orientation, different from the first orientation, of the design layout. In another example, the combination includes obtaining a first set of contours and a first illumination source, and configuring a second patterning process to have a second illumination source different from the first illumination source based on the first set of contours. The mask variation is used to determine mask pattern. In another example, the combination includes computing a cost function using a first configuration of the design variable, reconfiguring a first patterning process based on the cost function to satisfy a first termination condition, computing the cost function using the second configuration of the design variables, and reconfiguring a second patterning process based on the cost function to satisfy the first terminating condition and a second terminating condition defined based on results of the first patterning process.

In a lithographic projection apparatus, as an example, a cost function may be expressed as $$CF(z_1, z_2, \ldots, z_N) = \sum_{p=1}^{P} w_p f_p^2(z_1, z_2, \ldots, z_N) \quad \text{(Eq. 1)}$$

wherein $(z_1, z_2, \ldots, z_N)$ are N design variables or values thereof. $f_p(z_1, z_2, \ldots, z_N)$ can be a function of the design variables $(z_1, z_2, \ldots, z_N)$ such as a difference between an actual value and an intended value of a characteristic at an evaluation point for a set of values of the design variables of $(z_1, z_2, \ldots, z_N)$. $w_p$ is a weight constant associated with $f_p(z_1, z_2, \ldots, z_N)$. An evaluation point or pattern more critical than others can be assigned a higher $w_p$ value. Patterns and/or evaluation points with larger number of occurrences may be assigned a higher $w_p$ value, too. Examples of the evaluation points can be any physical point or pattern on the substrate, any point on a virtual design layout, or resist image, or aerial image, or a combination thereof. $CF(z_1, z_2, \ldots, z_N)$ can be a function of the illumination source, a function of a variable that is a function of the illumination source or that affects the illumination source. Of course, $CF(z_1, z_2, \ldots, z_N)$ is not limited to the form in Eq. 1. $CF(z_1, z_2, \ldots, z_N)$ can be in any other suitable form.

The cost function may represent any one or more suitable characteristics of the lithographic projection apparatus, lithographic process or the substrate, for instance, focus, CD, image shift, image distortion, image rotation, stochastic variation, throughput, local CD variation, process window, or a combination thereof. In one embodiment, the design variables $(z_1, z_2, \ldots, z_N)$ comprise one or more selected from dose, global bias of the patterning device, and/or shape of illumination. In one embodiment, the design variables $(z_1, z_2, \ldots, z_N)$ comprise the bandwidth of the source. Since it is the resist image that often dictates the pattern on a substrate, the cost function may include a function that represents one or more characteristics of the resist image. For example, $f_p(z_1, z_2, \ldots, z_N)$ of such an evaluation point can be simply a distance between a point in the resist image to an intended position of that point (i.e., edge placement error $EPE_p(z_1, z_2, \ldots, z_N)$). The design variables can include any adjustable parameter such as an adjustable parameter of the source (e.g., the intensity, and shape), the patterning device, the projection optics, dose, focus, etc.

The lithographic apparatus may include components collectively called a "wavefront manipulator" that can be used to adjust the shape of a wavefront and intensity distribution and/or phase shift of a radiation beam. In an embodiment, the lithographic apparatus can adjust a wavefront and intensity distribution at any location along an optical path of the lithographic projection apparatus, such as before the patterning device, near a pupil plane, near an image plane, and/or near a focal plane. The wavefront manipulator can be used to correct or compensate for certain distortions of the wavefront and intensity distribution and/or phase shift caused by, for example, the source, the patterning device, temperature variation in the lithographic projection apparatus, thermal expansion of components of the lithographic projection apparatus, etc. Adjusting the wavefront and intensity distribution and/or phase shift can change values of the evaluation points and the cost function. Such changes can be simulated from a model or actually measured.

The design variables may have constraints, which can be expressed as $(z_1, z_2, \ldots, z_N) \in Z$, where Z is a set of possible values of the design variables. One possible constraint on the design variables may be imposed by a desired throughput of the lithographic projection apparatus. Without such a constraint imposed by the desired throughput, the optimization may yield a set of values of the design variables that are unrealistic. For example, if the dose is a design variable, without such a constraint, the optimization may yield a dose value that makes the throughput economically impossible. However, the usefulness of constraints should not be interpreted as a necessity. For example, the throughput may be affected by the pupil fill ratio. For some illumination designs, a low pupil fill ratio may discard radiation, leading to lower throughput. Throughput may also be affected by the resist chemistry. Slower resist (e.g., a resist that requires higher amount of radiation to be properly exposed) leads to lower throughput. In an embodiment, the constraints on the design variables are such that the design variables cannot have values that change any geometrical characteristics of the patterning device—namely, the patterns on the patterning device will remain unchanged during the optimization.

The optimization process therefore is to find a set of values of the one or more design variables, under the constraints $(z_1, z_2, \ldots, z_N) \in Z$, that optimize the cost function, e.g., to find:

$$(\tilde{z}_1, \tilde{z}_2, \ldots, \tilde{z}_N) = \arg \min_{(z_1, z_2, \ldots, z_N) \in Z} CF(z_1, z_2, \ldots, z_N) \quad \text{(Eq. 2)}$$

Figure 10:
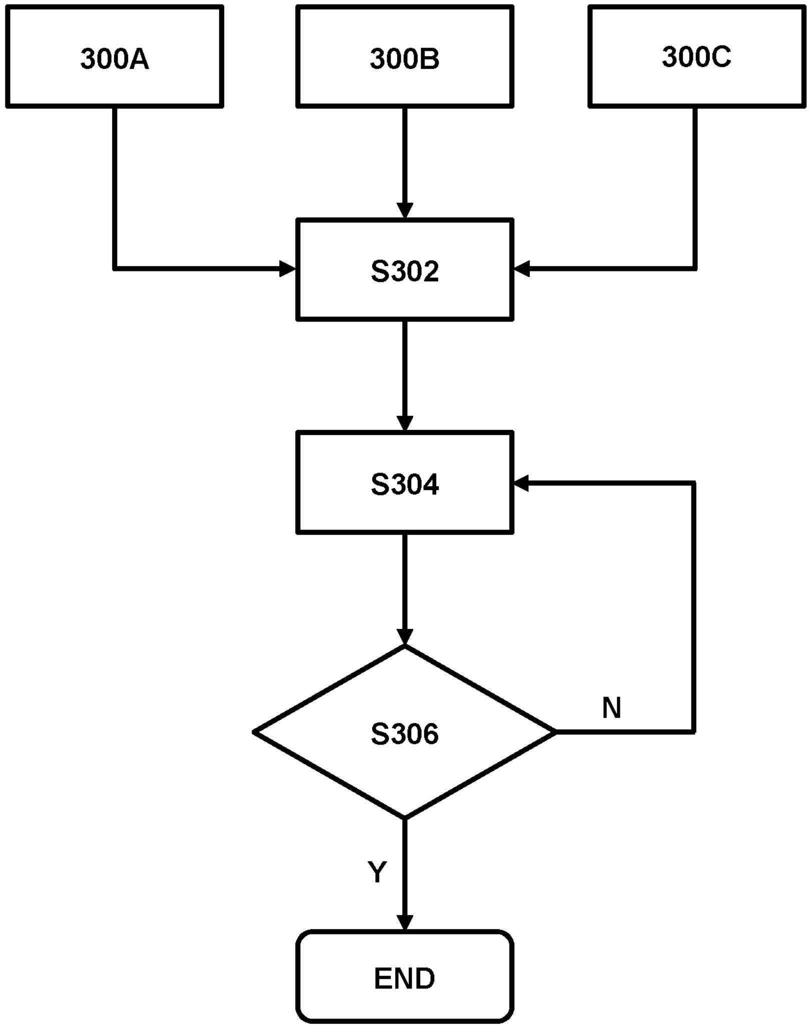
FIG. 10 is a flow diagram illustrating aspects of an example methodology of joint optimization/co-optimization, according to an embodiment of the present disclosure.

A general method of optimizing, according to an embodiment, is illustrated in FIG. 10. This method comprises a step S302 of defining a multi-variable cost function of a plurality of design variables. The design variables may comprise any suitable combination selected from design variables representing one or more characteristics of the illumination (300A) (e.g., pupil fill ratio, namely percentage of radiation of the illumination that passes through a pupil or aperture), one or more characteristics of the projection optics (300B) and/or one or more characteristics of the design layout (300C). For example, the design variables may include design variables representing one or more characteristics of the illumination (300A) (e.g., being or including the bandwidth) and of the design layout (300C) (e.g., global bias) but not of one or more characteristics of the projection optics (300B), which leads to an illumination-patterning device (e.g., mask) optimization ("source-mask optimization" or SMO). Or, the design variables may include design variables representing one or more characteristics of the illumination (300A) (optionally polarization), of the projection optics (300B) and of the design layout (300C), which leads to an illumination-patterning device (e.g., mask)-projection system (e.g., lens) optimization ("source-mask-lens optimization" or SMLO). Or, the design variables may include design variables representing one or more characteristics of the illumination (300A) (e.g., being or including the bandwidth), one or more non-geometrical characteristics of the patterning device, or one or more characteristics of the projection optics (300B), but not any geometrical characteristics of the patterning device. In step S304, the design variables are simultaneously adjusted so that the cost function is moved towards convergence. In an embodiment, not all design variables may be simultaneously adjusted. Each design variable may also be adjusted individually. In step S306, it is determined whether a predefined termination condition is satisfied. The predetermined termination condition may include various possibilities, e.g., one or more selected from: the cost function is minimized or maximized, as required by the numerical technique used, the value of the cost function is equal to a threshold value or crosses the threshold value, the value of the cost function reaches within a preset error limit, and/or a preset number of iterations is reached. If a condition in step S306 is satisfied, the method ends. If the one or more conditions in step S306 is not satisfied, the steps S304 and S306 are iteratively repeated until a desired result is obtained. The optimization does not necessarily lead to a single set of values for the one or more design variables because there may be a physical restraint, caused by a factor such as pupil fill factor, resist chemistry, throughput, etc. The optimization may provide multiple sets of values for the one or more design variables and associated performance characteristics (e.g., the throughput) and allows a user of the lithographic apparatus to pick one or more sets.

Different subsets of the design variables (e.g., one subset including characteristics of the illumination, one subset including characteristics of patterning device and one subset including characteristics of projection optics) can be optimized alternatively (referred to as Alternative Optimization) or optimized simultaneously (referred to as Simultaneous Optimization). So, two subsets of design variables being optimized "simultaneously" or "jointly" means that the design variables of the two subsets are allowed to change at the same time. Two subsets of design variables being optimized "alternatively" as used herein means that the design variables of the first subset but not the second subset are allowed to change in the first optimization and then the design variables of the second subset but not the first subset are allowed to change in the second optimization.

Figure 11:
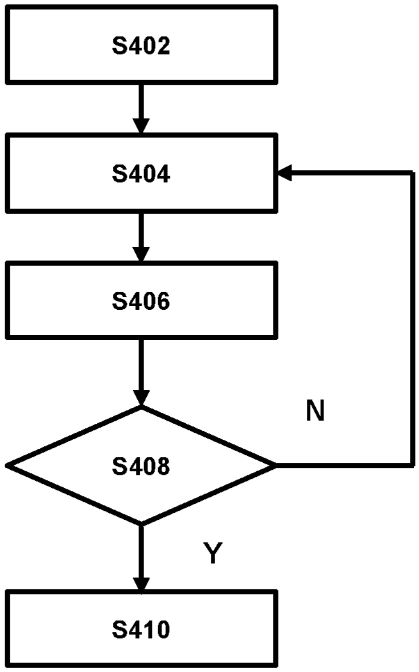
FIG. 11 shows an embodiment of a further optimization method, according to an embodiment of the present disclosure.

In FIG. 10, the optimization of all the design variables is executed simultaneously. Such a flow may be called simultaneous flow or co-optimization flow. Alternatively, the optimization of all the design variables is executed alternatively, as illustrated in FIG. 11. In this flow, in each step, some design variables are fixed while other design variables are optimized to optimize the cost function; then in the next step, a different set of variables are fixed while the others are optimized to minimize or maximize the cost function. These steps are executed alternatively until convergence or a certain terminating condition is met. As shown in the non-limiting example flowchart of FIG. 11, first, a design layout (step S402) is obtained, then a step of illumination optimization is executed in step S404, where the one or more design variables (e.g., the bandwidth) of the illumination are optimized (SO) to minimize or maximize the cost function while other design variables are fixed. Then in the next step S406, a projection optics optimization (LO) is performed, where the design variables of the projection optics are optimized to minimize or maximize the cost function while other design variables are fixed. These two steps are executed alternatively, until a certain terminating condition is met in step S408. One or more various termination conditions can be used, such as the value of the cost function becomes equal to a threshold value, the value of the cost function crosses the threshold value, the value of the cost function reaches within a preset error limit, a preset number of iterations is reached, etc. Note that SO-LO-Alternative-Optimization is used as an example for the alternative flow. As another example, a first illumination-patterning device co-optimization (SMO) or illumination-patterning device-projection optics co-optimization (SMLO) can be performed without allowing the bandwidth to change, followed by a second SO or illumination-projection optics co-optimization (SLO) allowing the bandwidth to change. Finally the output of the optimization result is obtained in step S410, and the process stops.

The pattern selection algorithm, as discussed before, may be integrated with the simultaneous or alternative optimization. For example, when an alternative optimization is adopted, first a full-chip SO can be performed, one or more 'hot spots' and/or 'warm spots' are identified, then a LO is performed. In view of the present disclosure numerous permutations and combinations of sub-optimizations are possible in order to achieve the desired optimization results.

Figure 12A:
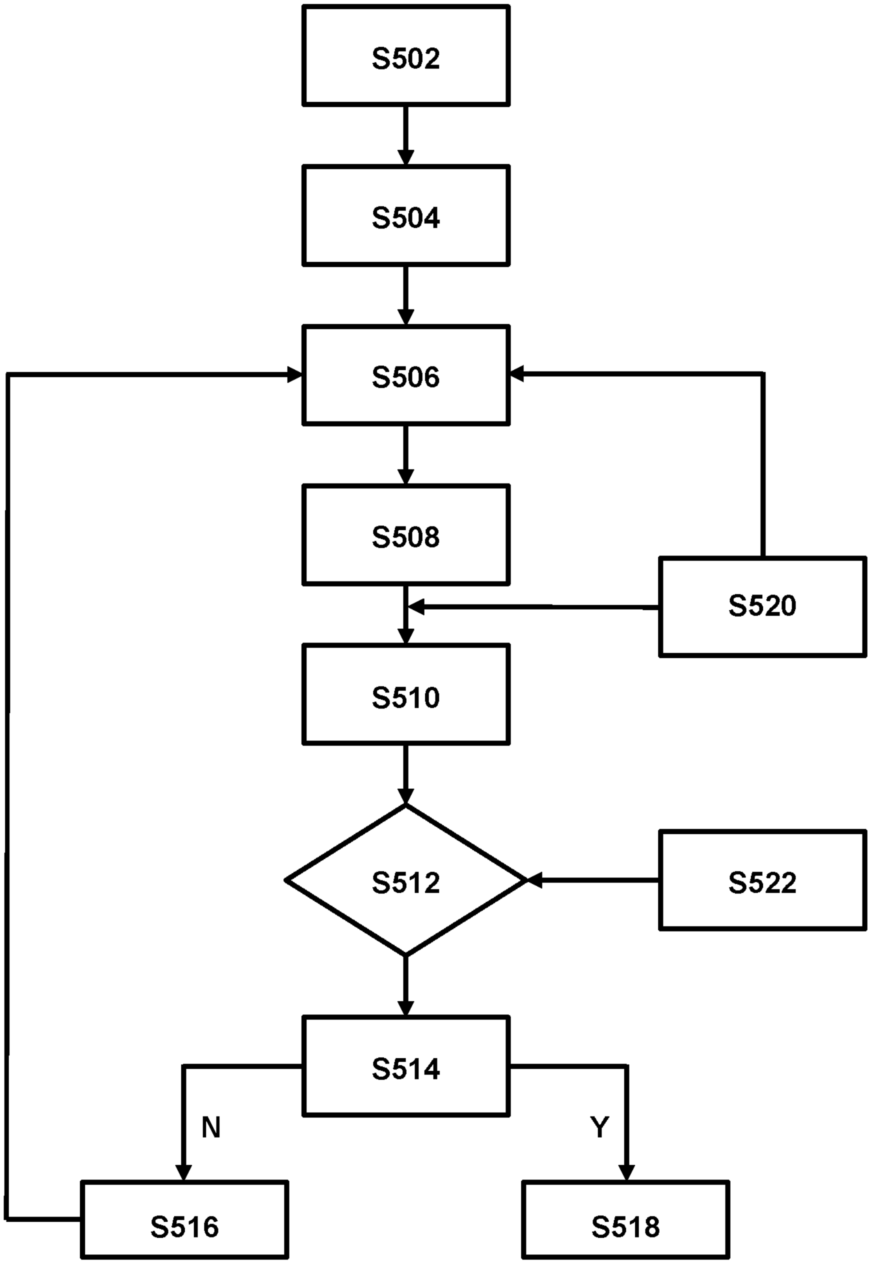
FIG. 12A, FIG. 12B and FIG. 13 show example flowcharts of various optimization processes, according to an embodiment of the present disclosure.

FIG. 12A shows one exemplary method of optimization, where a cost function is minimized or maximized. In step S502, initial values of one or more design variables are obtained, including one or more associated tuning ranges, if any. In step S504, the multi-variable cost function is set up. In step S506, the cost function is expanded within a small enough neighborhood around the starting point value of the one or more design variables for the first iterative step (i=0). In step S508, standard multi-variable optimization techniques are applied to the cost function. Note that the optimization problem can apply constraints, such as the one or more tuning ranges, during the optimization process in S508 or at a later stage in the optimization process. Step S520 indicates that each iteration is done for the one or more given test patterns (also known as "gauges") for the identified evaluation points that have been selected to optimize the lithographic process. In step S510, a lithographic response is predicted. In step S512, the result of step S510 is compared with a desired or ideal lithographic response value obtained in step S522. If the termination condition is satisfied in step S514, i.e. the optimization generates a lithographic response value sufficiently close to the desired value, then the final value of the design variables is outputted in step S518. The output step may also include outputting one or more other functions using the final values of the design variables, such as outputting a wavefront aberration-adjusted map at the pupil plane (or other planes), an optimized illumination map, and/or optimized design layout etc. If the termination condition is not satisfied, then in step S516, the values of the one or more design variables is updated with the result of the i-th iteration, and the process goes back to step S506. The process of FIG. 12A is elaborated in details below.

In an exemplary optimization process, no relationship between the design variables $(z_1, z_2, \ldots, z_N)$ and $f_p(z_1, z_2, \ldots, z_N)$ is assumed or approximated, except that $f_p(z_1, z_2, \ldots, z_N)$ is sufficiently smooth (e.g. first order derivatives $$\frac{\partial f_p(z_1, z_2, \ldots, z_N)}{\partial z_n},$$

(n=1, 2, . . . N) exist), which is generally valid in a lithographic projection apparatus. An algorithm, such as the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm, can be applied to find $(\tilde{z}_1, \tilde{z}_2, \ldots, \tilde{z}_N)$.

Here, the Gauss-Newton algorithm is used as an example. The Gauss-Newton algorithm is an iterative method applicable to a general non-linear multi-variable optimization problem. In the i-th iteration wherein the design variables $(z_1, z_2, \ldots, z_N)$ take values of $(z_{1i}, z_{2i}, \ldots, z_{Ni})$, the Gauss-Newton algorithm linearizes $f_p(z_1, z_2, \ldots, z_N)$ in the vicinity of $(z_{1i}, z_{2i}, \ldots, z_{Ni})$, and then calculates values $(z_{1(i+1)}, z_{2(i+1)}, \ldots, z_{N(i+1)})$ in the vicinity of $(z_{1i}, z_{2i}, \ldots, z_{Ni})$ that give a minimum of $CF(z_1, z_2, \ldots, z_N)$. The design variables $(z_1, z_2, \ldots, z_N)$ take the values of $(z_{1(i+1)}, z_{2(i+1)}, \ldots, z_{N(i+1)})$ in the (i+1)-th iteration. This iteration continues until convergence (i.e. $CF(z_1, z_2, \ldots, z_N)$ does not reduce any further) or a preset number of iterations is reached.

Specifically, in the i-th iteration, in the vicinity of $(z_{1i}, z_{2i}, \ldots, z_{Ni})$, $$f_p(z_1, z_2, \ldots, z_N) \approx f_p(z_{1i}, z_{2i}, \ldots, z_{Ni}) + \sum_{n=1}^{N} \frac{\partial f_p(z_1, z_2, \ldots, z_N)}{\partial z_n}\Big|_{z_1=z_{1i}, z_2=z_{2i}, \ldots z_N=z_{Ni}} (z_n = z_{ni}) \quad \text{(Eq. 3)}$$

Under the approximation of Eq. 3, the cost function becomes:

$$CF(z_1, z_2, \ldots, z_N) = \sum_{p=1}^{P} w_p f_p^2(z_1, z_2, \ldots, z_N) = \sum_{p=1}^{P} w_p \left( f_p(z_{1i}, z_{2i}, \ldots, z_{Ni}) + \sum_{n=1}^{N} \frac{\partial f_p(z_1, z_2, \ldots, z_N)}{\partial z_n} \Big|_{z_1=z_{1i}, z_2=z_{2i}, \ldots z_N=z_{Ni}} (z_n - z_{ni}) \right)^2 \quad \text{(Eq. 4)}$$

which is a quadratic function of the design variables ($z_1$, $z_2$, . . . , $z_N$). Every term is constant except the design variables ($z_1$, $z_2$, . . . , $z_N$).

If the design variables ($z_1$, $z_2$, . . . , $z_N$) are not under any constraints, ($z_{1(i+1)}$, $z_{2(i+1)}$, . . . , $z_{N(i+1)}$) can be derived by solving N linear equations:

$$\frac{\partial CF(z_1, z_2, \ldots, z_N)}{\partial z_n} = 0, \text{ wherein } n = 1, 2, \ldots, N.$$

If the design variables ($z_1$, $z_2$, . . . , $z_N$) are under constraints in the form of J inequalities (e.g. tuning ranges of $$(z_1, z_2, \ldots, z_N)) \sum_{n=1}^{N} A_{nj} z_n \le B_j,$$

for j=1, 2, . . . , J; and K equalities (e.g. interdependence between the design variables)

$$\sum_{n=1}^{N} C_{nk} z_n \le D_k, \text{ for } k = 1, 2, \ldots, K,$$

the optimization process becomes a classic quadratic programming problem, wherein $A_{nj}$, $B_j$, $C_{nk}$, $D_k$ are constants. Additional constraints can be imposed for each iteration. For example, a "damping factor" $\Delta_D$, can be introduced to limit the difference between ($z_{1(i+1)}$, $z_{2(i+1)}$, . . . , $z_{N(i+1)}$) and ($z_{1i}$, $z_{2i}$, . . . , $z_{Ni}$), so that the approximation of Eq. 3 holds. Such constraints can be expressed as $z_{ni}-\Delta_D \le z_n \le z_{ni}+\Delta_D$. ($z_{1(i+1)}$, $z_{2(i+1)}$, . . . , $z_{N(i+1)}$) can be derived using, for example, methods described in Numerical Optimization ($2^{nd}$ ed.) by Jorge Nocedal and Stephen J. Wright (Berlin New York: Vandenberghe. Cambridge University Press).

Instead of minimizing the RMS of $f_p(z_1, z_2, \ldots, z_N)$, the optimization process can minimize magnitude of the largest deviation (the worst defect) among the evaluation points to their intended values. In this approach, the cost function can alternatively be expressed as $$CF(z_1, z_2, \ldots, z_N) = \max_{1 \le p \le P} \frac{f_p(z_1, z_2, \ldots, z_N)}{CL_p} \quad \text{(Eq. 5)}$$

wherein $CL_p$ is the maximum allowed value for $f_p(z_1, z_2, \ldots, z_N)$. This cost function represents the worst defect among the evaluation points. Optimization using this cost function minimizes magnitude of the worst defect. An iterative greedy algorithm can be used for this optimization.

The cost function of Eq. 5 can be approximated as:

$$CF(z_1, z_2, \ldots, z_N) = \sum_{p=1}^{P} w_p \left( \frac{f_p(z_1, z_2, \ldots, z_N)}{CL_p} \right)^q \quad \text{(Eq. 6)}$$

wherein q is an even positive integer such as at least 4, or at least 10. Eq. 6 mimics the behavior of Eq. 5, while allowing the optimization to be executed analytically and accelerated by using methods such as the deepest descent method, the conjugate gradient method, etc.

Minimizing the worst defect size can also be combined with linearizing of $f_p(z_1, z_2, \ldots, z_N)$. Specifically, $f_p(z_1, z_2, \ldots, z_N)$ is approximated as in Eq. 3. Then the constraints on worst defect size are written as inequalities $E_{Lp} \le f_p(z_1, z_2, \ldots, z_N) \le E_{Up}$, wherein $E_{Lp}$ and $E_{Up}$, are two constants specifying the minimum and maximum allowed deviation for the $f_p(z_1, z_2, \ldots, z_N)$. Plugging Eq. 3 in, these constraints are transformed to, for p=1, . . . P, $$\sum_{n=1}^{N} \frac{\partial f_p(z_1, z_2, \ldots, z_N)}{\partial z_n} \Big|_{z_1=z_{1i}, z_2=z_{2i}, \ldots z_N=z_{Ni}} z_n \le E_{Up} + \sum_{n=1}^{N} \frac{\partial f_p(z_1, z_2, \ldots, z_N)}{\partial z_n} \Big|_{z_1=z_1, z_2=z_{2i}, \ldots z_N=z_{Ni}} z_{ni} - f_p(z_{1i}, z_{2i}, \ldots, z_{Ni}) \quad \text{(Eq. 6')}$$

and $$-\sum_{n=1}^{N} \frac{\partial f_p(z_1, z_2, \ldots, z_N)}{\partial z_n} \Big|_{z_1=z_{1i}, z_2=z_{2i}, \ldots z_N=z_{Ni}} z_n \le -E_{up} - \sum_{n=1}^{N} \frac{\partial f_p(z_1, z_2, \ldots, z_N)}{\partial z_n} \Big|_{z_1=z_{1i}, z_2=z_{2i}, \ldots z_N=z_{Ni}} z_{ni} + f_P(z_{1i}, z_{2i}, \ldots, z_{Ni}) \quad \text{(Eq. 6'')}$$

Since Eq. 3 is generally valid only in the vicinity of ($z_1$, $z_2$, . . . , $z_N$), in case the desired constraints $E_{Lp} \le f_p(z_1, z_2, \ldots, z_N) \le E_{Up}$ cannot be achieved in such vicinity, which can be determined by any conflict among the inequalities, the constants $E_{Lp}$ and $E_{Up}$ can be relaxed until the constraints are achievable. This optimization process minimizes the worst defect size in the vicinity of ($z_1$, $z_2$, . . . , $z_N$), i. Then each step reduces the worst defect size gradually, and each step is executed iteratively until certain terminating conditions are met. This will lead to optimal reduction of the worst defect size.

Another way to minimize the worst defect is to adjust the weight $w_p$ in each iteration. For example, after the i-th iteration, if the r-th evaluation point is the worst defect, $w_r$ can be increased in the (i+1)-th iteration so that the reduction of that evaluation point's defect size is given higher priority.

In addition, the cost functions in Eq. 4 and Eq. 5 can be modified by introducing a Lagrange multiplier to achieve compromise between the optimization on RMS of the defect size and the optimization on the worst defect size, i.e., $$CF(z_1, z_2, \ldots, z_N) = (1 - \lambda) \sum_{p=1}^{P} w_p f_p^2(z_1, z_2, \ldots, z_N) + \lambda_1 \max_{\le p \le P} \frac{f_p(z_1, z_2, \ldots, z_N)}{CL_p} \quad \text{(Eq. 6''')}$$

where $\lambda$ is a preset constant that specifies the trade-off between the optimization on RMS of the defect size and the optimization on the worst defect size. In particular, if $\lambda=0$, then this becomes Eq. 4 and the RMS of the defect size is only minimized; while if $\lambda=1$, then this becomes Eq. 5 and the worst defect size is only minimized; if $0<\lambda<1$, then both are taken into consideration in the optimization. Such optimization can be solved using multiple methods. For example, the weighting in each iteration may be adjusted, similar to the one described previously. Alternatively, similar to minimizing the worst defect size from inequalities, the inequalities of Eq. 6' and 6" can be viewed as constraints of the design variables during solution of the quadratic programming problem. Then, the bounds on the worst defect size can be relaxed incrementally or increase the weight for the worst defect size incrementally, compute the cost function value for every achievable worst defect size, and choose the design variable values that minimize the total cost function as the initial point for the next step. By doing this iteratively, the minimization of this new cost function can be achieved.

Optimizing a lithographic projection apparatus can expand the process window. A larger process window provides more flexibility in process design and chip design. The process window can be defined as, for example, a set of focus, dose, aberration, laser bandwidth (e.g. E95 or ($\lambda$min to $\lambda$max) and fare specific to intensity values for which the resist image is within a certain limit of the design target of the resist image. Note that all the methods discussed here may also be extended to a generalized process window definition that can be established by different or additional base parameters than exposure dose and defocus. These may include, but are not limited to, optical settings such as NA, sigma, aberration, polarization, or an optical constant of the resist layer. For example, as described earlier, if the process window (PW) also comprises different patterning device pattern bias (mask bias), then the optimization includes the minimization of Mask Error Enhancement Factor (MEEF), which is defined as the ratio between the substrate edge placement error (EPE) and the induced patterning device pattern edge bias. The process window defined on focus and dose values only serve as an example in this disclosure.

A method of maximizing a process window using, for example, dose and focus as its parameters, according to an embodiment, is described below. In a first step, starting from a known condition $(f_0, \varepsilon_0)$ in the process window, wherein $f_0$ is a nominal focus and $\varepsilon_0$ is a nominal dose, minimizing one of the cost functions below in the vicinity $(f_0\pm\Delta f,\ \varepsilon_0\pm\varepsilon)$:

$$CF(z_1, z_2, \ldots, z_N f_0, \varepsilon_0) = \max_{(f,\varepsilon)=f_0\pm\Delta f,\varepsilon_0\pm\varepsilon} \max_p |f_p(z_1, z_2, \ldots, z_N, f, \varepsilon)| \text{ or} \quad \text{(Eq. 7)}$$

$$CF(z_1, z_2, \ldots, z_N, f_0, \varepsilon_0) = \sum\nolimits_{(f,\varepsilon)=(f_0\pm\Delta f,\varepsilon_0\pm\varepsilon)} \sum\nolimits_p w_p f_p^2(z_1, z_2, \ldots, z_N, f, \varepsilon) \text{ or} \quad \text{(Eq. 7')}$$

$$CF(z_1, z_2, \ldots, z_N, f_0, \varepsilon_0) = (1-\lambda)\sum\nolimits_{(f,\varepsilon)=f_0\pm\Delta f,\varepsilon_0\pm\varepsilon)} \sum\nolimits_p w_p f_p^2(z_1, z_2, \ldots, z_N, f, \varepsilon) + \lambda \max_{(f,\varepsilon)=f_0\pm\Delta f,\varepsilon_0\pm\varepsilon)} \max_p |f_p(z_1, z_2, \ldots, z_N, f, \varepsilon)| \quad \text{(Eq. 7'')}$$

If the nominal focus $f_0$ and nominal dose $\varepsilon_0$ are allowed to shift, they can be optimized jointly with the design variables $(z_1, z_2, \ldots, z_N)$. In the next step, $(f_0\pm\Delta f,\ \varepsilon_0\pm\varepsilon)$ is accepted as part of the process window, if a set of values of $(z_1, z_2, \ldots, z_N, f, \varepsilon)$ can be found such that the cost function is within a preset limit.

If the focus and dose are not allowed to shift, the design variables $(z_1, z_2, \ldots, z_N)$ are optimized with the focus and dose fixed at the nominal focus $f_0$ and nominal dose $\varepsilon_0$. In an alternative embodiment, $(f_0\pm\Delta f,\ \varepsilon_0\pm\varepsilon)$ is accepted as part of the process window, if a set of values of $(z_1, z_2, \ldots, z_N)$ can be found such that the cost function is within a preset limit.

The methods described earlier in this disclosure can be used to minimize the respective cost functions of Eqs. 7, 7', or 7". If the design variables represent one or more characteristics of the projection optics, such as the Zernike coefficients, then minimizing the cost functions of Eqs. 7, 7', or 7" leads to process window maximization based on projection optics optimization, i.e., LO. If the design variables represent one or more characteristics of the illumination and patterning device in addition to those of the projection optics, then minimizing the cost function of Eqs. 7, 7', or 7" leads to process window maximizing based on SMLO, as illustrated in FIG. 10. If the design variables represented one or more characteristics of the source and patterning device, then minimizing the cost functions of Eqs. 7, 7', or 7" leads to process window maximization based on SMO. The cost functions of Eqs. 7, 7', or 7" can also include at least one $f_p(z_1, z_2, \ldots, z_N)$ such as described herein, that is a function of the bandwidth.

Figure 13:
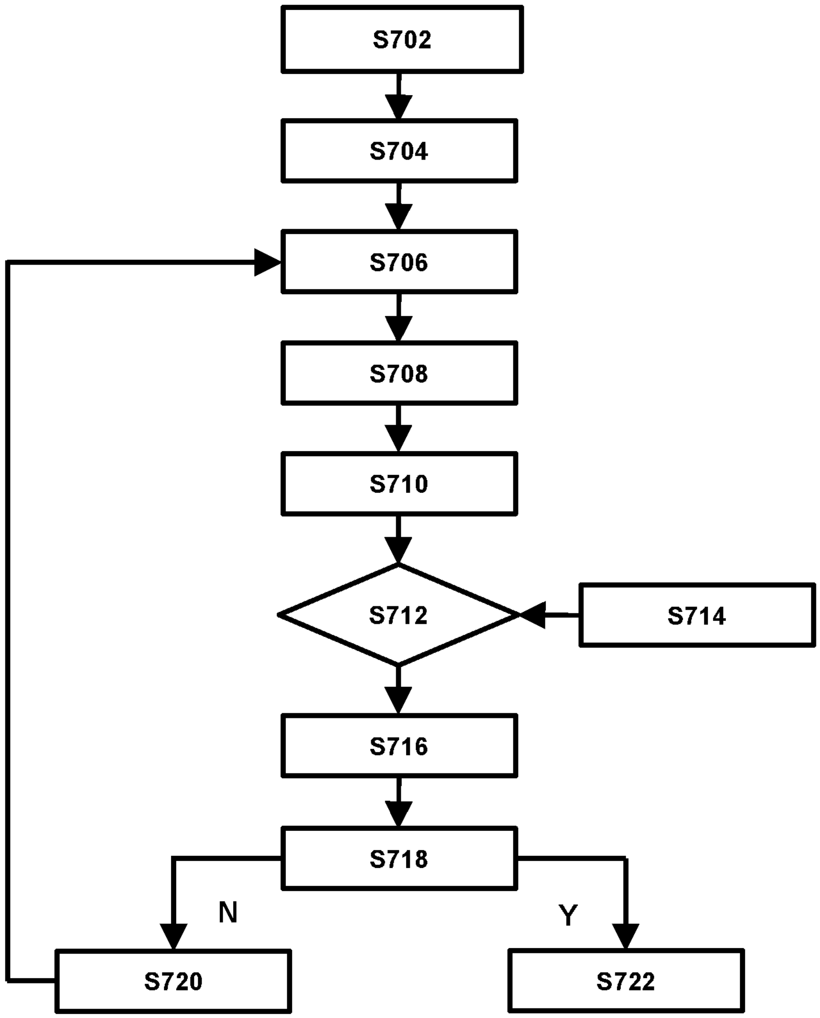

FIG. 13 shows one specific example of how a simultaneous SMLO process can use a gradient based optimization (e.g. quasi newton, or Gauss Newton Algorithm). In step S702, starting values of one or more design variables are identified. A tuning range for each variable may also be identified. In step S704, the cost function is defined using the one or more design variables. In step S706, the cost function is expanded around the starting values for all evaluation points in the design layout. In step S708, a suitable optimization technique is applied to minimize or maximize the cost function. In optional step S710, a full-chip simulation is executed to cover all critical patterns in a full-chip design layout. A desired lithographic response metric (such as CD, EPE, or EPE and PPE) is obtained in step S714, and compared with predicted values of those quantities in step S712. In step S716, a process window is determined. Steps S718, S720, and S722 are similar to corresponding steps S514, S516 and S518, as described with respect to FIG. 12A. As mentioned before, the final output may be, for example, a wavefront aberration map in the pupil plane, optimized to produce the desired imaging performance. The final output may be, for example, an optimized illumination map and/or an optimized design layout.

Figure 12B:
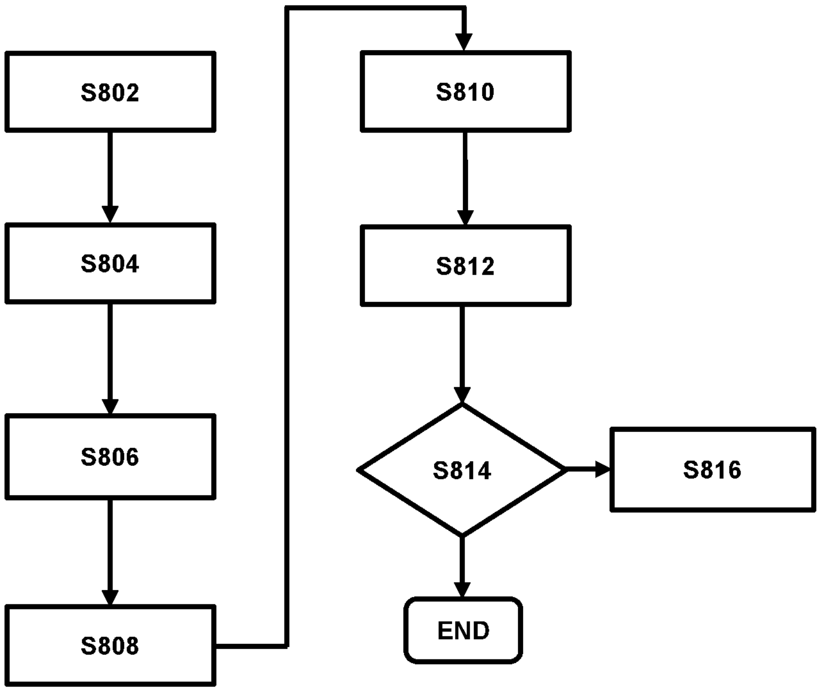

FIG. 12B shows an exemplary method to optimize the cost function where the design variables $(z_1, z_2, \ldots, z_N)$ include design variables that may only assume discrete values.

The method starts by defining the pixel groups of the illumination and the patterning device tiles of the patterning device (step S802). Generally, a pixel group or a patterning device tile may also be referred to as a division of a lithographic process component. In one exemplary approach, the illumination is divided into 117 pixel groups, and 94 patterning device tiles are defined for the patterning device, substantially as described above, resulting in a total of 211 divisions.

In step S804, a lithographic model is selected as the basis for lithographic simulation. A lithographic simulation produces results that are used in calculations of one or more lithographic metrics, or responses. A particular lithographic metric is defined to be the performance metric that is to be optimized (step S806). In step S808, the initial (pre-optimization) conditions for the illumination and the patterning device are set up. Initial conditions include initial states for the pixel groups of the illumination and the patterning device tiles of the patterning device such that references may be made to an initial illumination shape and an initial patterning device pattern. Initial conditions may also include patterning device pattern bias (sometimes referred to as mask bias), NA, and/or focus ramp range. Although steps S802, S804, S806, and S808 are depicted as sequential steps, it will be appreciated that in other embodiments, these steps may be performed in other sequences.

In step S810, the pixel groups and patterning device tiles are ranked. Pixel groups and patterning device tiles may be interleaved in the ranking Various ways of ranking may be employed, including: sequentially (e.g., from pixel group 1 to pixel group 117 and from patterning device tile 1 to patterning device tile 94), randomly, according to the physical locations of the pixel groups and patterning device tiles (e.g., ranking pixel groups closer to the center of the illumination higher), and/or according to how an alteration of the pixel group or patterning device tile affects the performance metric.

Once the pixel groups and patterning device tiles are ranked, the illumination and patterning device are adjusted to improve the performance metric (step S812). In step S812, each of the pixel groups and patterning device tiles are analyzed, in order of ranking, to determine whether an alteration of the pixel group or patterning device tile will result in an improved performance metric. If it is determined that the performance metric will be improved, then the pixel group or patterning device tile is accordingly altered, and the resulting improved performance metric and modified illumination shape or modified patterning device pattern form the baseline for comparison for subsequent analyses of lower-ranked pixel groups and patterning device tiles. In other words, alterations that improve the performance metric are retained. As alterations to the states of pixel groups and patterning device tiles are made and retained, the initial illumination shape and initial patterning device pattern changes accordingly, so that a modified illumination shape and a modified patterning device pattern result from the optimization process in step S812.

In other approaches, patterning device polygon shape adjustments and pairwise polling of pixel groups and/or patterning device tiles are also performed within the optimization process of S812.

In an embodiment, the interleaved simultaneous optimization procedure may include altering a pixel group of the illumination and if an improvement of the performance metric is found, the dose or intensity is stepped up and/or down to look for further improvement. In a further embodiment, the stepping up and/or down of the dose or intensity may be replaced by a bias change of the patterning device pattern to look for further improvement in the simultaneous optimization procedure.

In step S814, a determination is made as to whether the performance metric has converged. The performance metric may be considered to have converged, for example, if little or no improvement to the performance metric has been witnessed in the last several iterations of steps S810 and S812. If the performance metric has not converged, then the steps of S810 and S812 are repeated in the next iteration, where the modified illumination shape and modified patterning device from the current iteration are used as the initial illumination shape and initial patterning device for the next iteration (step S816).

The optimization methods described above may be used to increase the throughput of the lithographic projection apparatus. For example, the cost function may include a $f_p(z_1, z_2, \ldots, z_N)$ that is a function of the exposure time. In an embodiment, optimization of such a cost function is constrained or influenced by a measure of the bandwidth or other metric.

Figure 14:
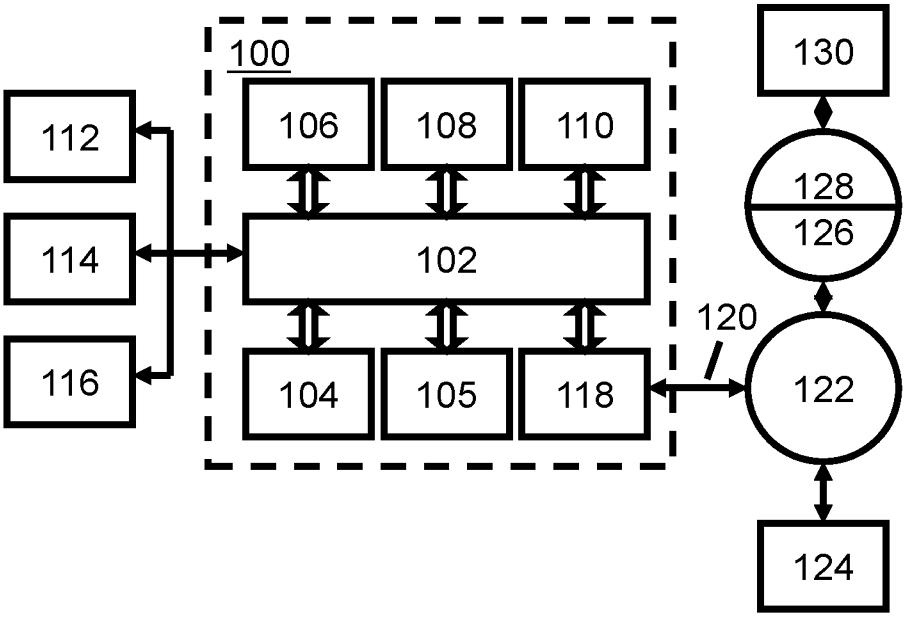
FIG. 14 is a block diagram of an example computer system, according to an embodiment of the present disclosure.

FIG. 14 is a block diagram that illustrates a computer system 100 which can assist in implementing the optimization methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 15:
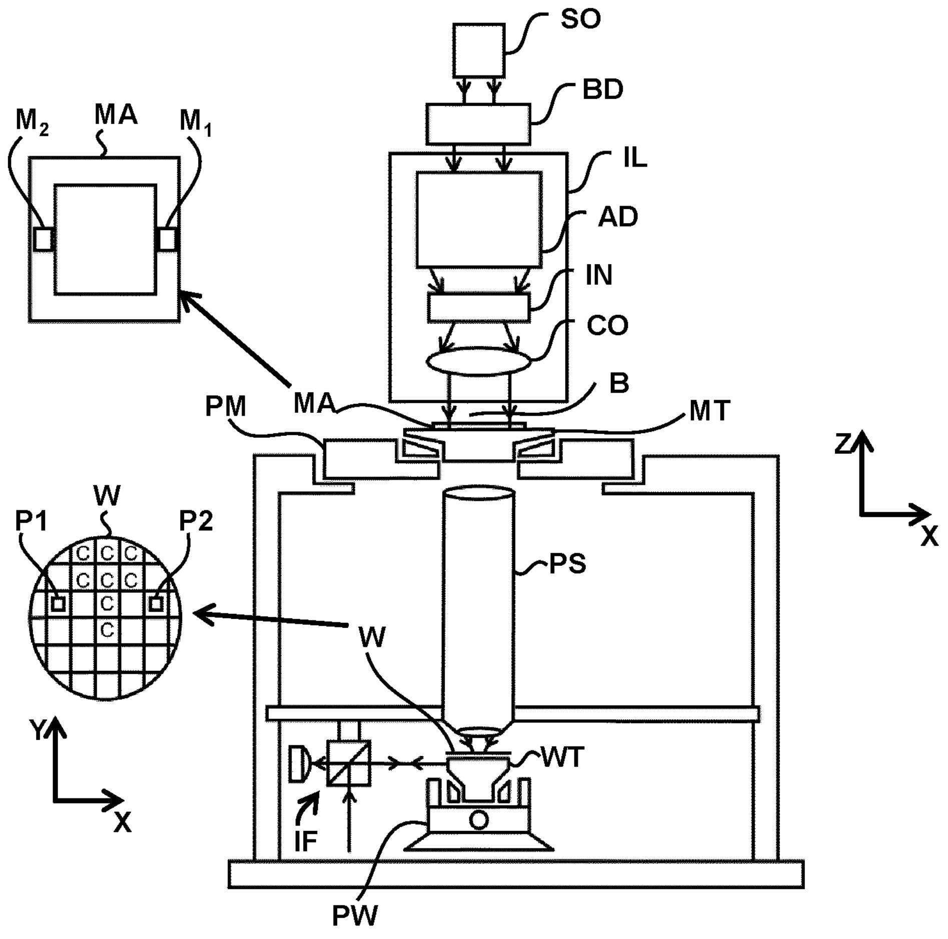
FIG. 15 is a schematic diagram of a lithographic projection apparatus, according to an embodiment of the present disclosure.

FIG. 15 schematically depicts an exemplary lithographic projection apparatus whose illumination could be optimized utilizing the methods described herein. The apparatus comprises:

- an illumination system IL, to condition a beam B of radiation. In this particular case, the illumination system also comprises a radiation source SO;
- a first object table (e.g., patterning device table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 15 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 15. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 16:
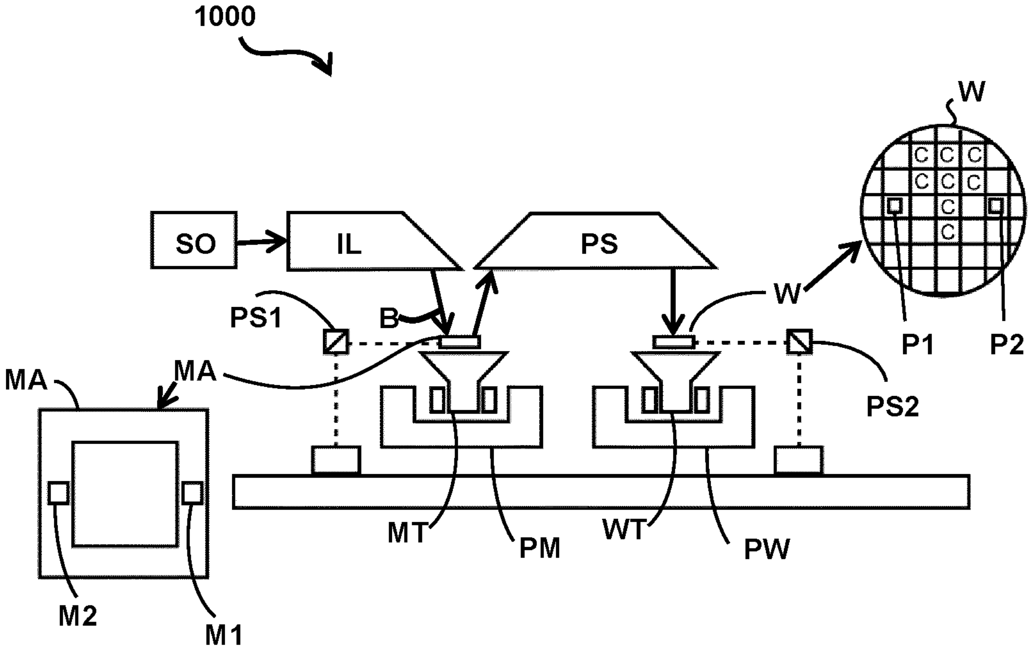
FIG. 16 is a schematic diagram of another lithographic projection apparatus, according to an embodiment of the present disclosure.

FIG. 16 schematically depicts another exemplary lithographic projection apparatus 1000 whose illumination could be optimized utilizing the methods described herein.

The lithographic projection apparatus 1000 comprises:

a source collector module SO an illumination system (illuminator) IL configured to condition a radiation beam B (e.g. EUV radiation).

a support structure (e.g. a patterning device table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 16, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 16, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.
2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.
3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 17:
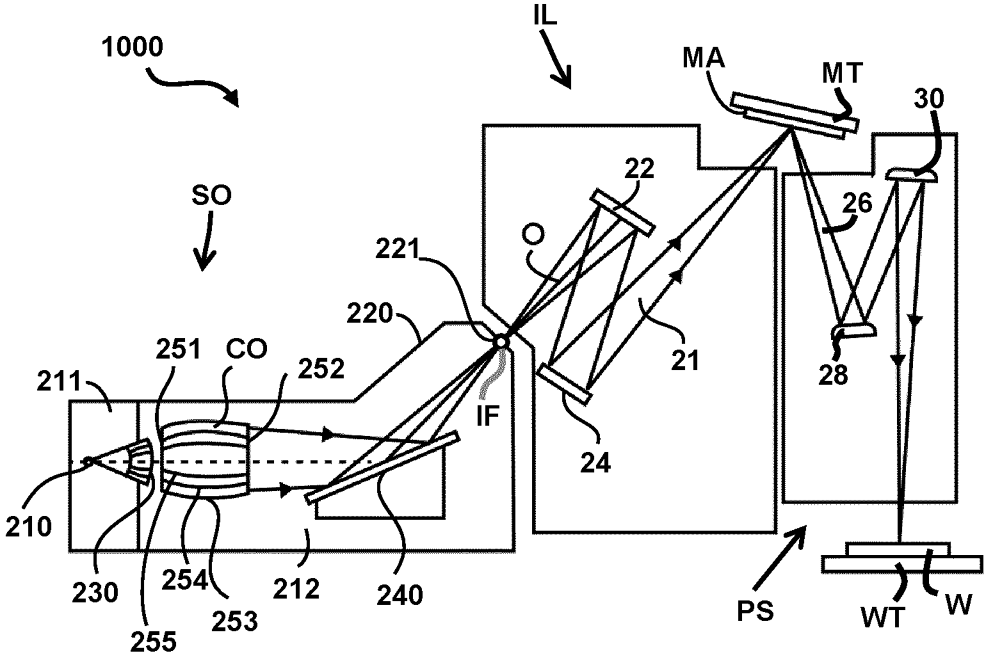
FIG. 17 is a more detailed view of the apparatus in FIG. 16, according to an embodiment of the present disclosure.

FIG. 17 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 17.

Collector optic CO, as illustrated in FIG. 17, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 18:
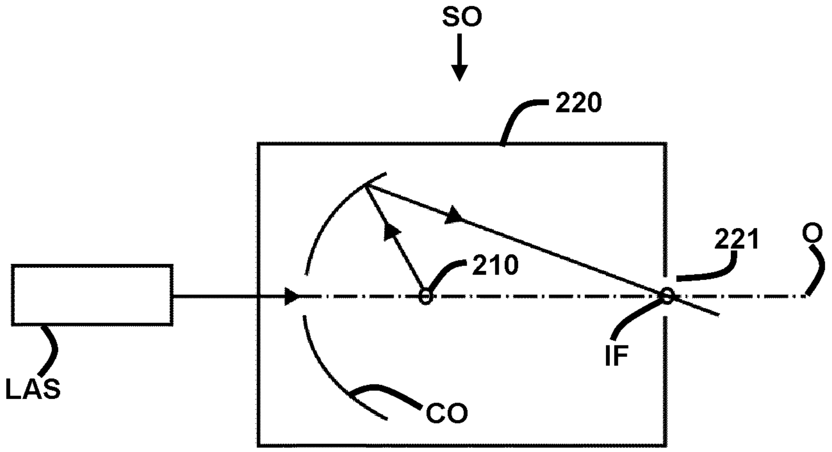
FIG. 18 is a more detailed view of the source collector module SO of the apparatus of FIG. 16 and FIG. 17, according to an embodiment of the present disclosure.

Alternatively, the source collector module SO may be part of an LPP radiation system as shown in FIG. 18. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

U.S. Patent Application Publication No. US 2013-0179847 is hereby incorporated by reference in its entirety.

The embodiments may further be described using the following clauses:

1. A non-transitory computer-readable medium for configuring a patterning process of imaging a design layout onto a substrate using a lithographic apparatus, the medium comprising instructions stored therein that, when executed by one or more processors, cause operations comprising:
   obtaining a first set of contours of structures on a substrate by simulating a first patterning process using a design layout in a first orientation, each contour within the first set of contours satisfying a design specification associated with the design layout, the first set of contours corresponding to a first set of process window conditions; and
   configuring a second patterning process based on a second orientation of the design layout, the first set of process window conditions and first set of contours, the second orientation being different from the first orientation, the second patterning process being associated with one or more design variables that affect a second set of contours of the structures, the configuring comprising:
      adjusting one or more design variables until the second set of contours are within a desired matching threshold with the first set of contours, the one or more design variables comprising variables associated with an illumination source of the second patterning process.
2. The medium of clause 1, further comprising:
   adjusting of the one or more design variables until a performance metric of the second patterning process is within acceptable limits of a first performance metric of the first patterning process.
3. The medium of clause 2, wherein the first performance metric comprises:
   depth of focus associated with the first patterning process;
   an image contrast associated with the first patterning process; and/or
   a process variation band associated with a process variable of the first patterning process.

4. The medium of any of clauses 1-3, wherein the first set of contours comprises a set of simulated contours of the structures associated with the first set of process window conditions.
5. The medium of clause 4, wherein the first set of contours comprises:
   a first contour obtained using a first process window condition within the first set of process window conditions; and
   a second contour obtained using a second process window condition within the first set of process window conditions.
6. The medium of any of clauses 1-5, wherein the first set of process window conditions comprises values of process variables related to the first patterning process, the process variables comprising at one of: dose, focus, bias, flare, aberration or a combination thereof.
7. The medium of clause 6, wherein:
   a first process window condition of the first set of process window conditions comprises a first extreme value of a process variable
   a second process window condition of the first set of process window conditions comprises a second extreme value of the process variable.
8. The medium of any of clauses 1-7, wherein the design variables comprises one or more variables associated with:
   an illumination source of the lithographic apparatus;
   geometric properties of the design layout;
   projection optics of the lithographic apparatus;
   a resist process related parameter; and/or
   a etching process related parameter.
9. The medium of any of clauses 1-8, wherein the second orientation is a predetermined rotation amount relatively to the first orientation of the design layout, the predetermined rotation amount relating to an orientation of a portion of the substrate being patterned.
10. The medium of clause 9, wherein the predetermined rotation amount is within a range 0°-360° with respect to the first orientation.
11. The medium of any of clauses 1-10, wherein the second orientation of the design layout is rotated by 90° with respect to the first orientation of the design layout.
12. The medium of any of clauses 1-11, wherein the one or more design variables associated with the second patterning process comprises an illumination pupil shape, the illumination pupil shape being rotated by a different amount than an illumination pupil shape associated with the first patterning process for the same design layout.
13. The medium of any of clauses 1-12, wherein the first patterning process includes a first illumination pupil having a first pupil shape in the first orientation, and
   the second patterning process includes a second illumination pupil having a second shape different from the first illumination pupil shape, and/or an orientation different from the first orientation and second orientation.
14. The medium of any of clauses 1-13, wherein configuring the second patterning process comprises:
   performing, via one or more process models associated with the second patterning process using the set of first process window conditions as inputs, a source optimization until each of the second set of contours of the second patterning process are within the desired matching threshold with each corresponding contour of the first set of contours.
15. The medium of any of clauses 1-13, wherein configuring the second patterning process comprises:
   performing, via one or more process models associated with the second patterning process using the set of first process window conditions as inputs, a source mask co-optimization until each of the second set of contours of the second patterning process are within the desired matching threshold with each corresponding contour of the first set of contours.
16. The medium of any of clauses 14-15, wherein configuring the second patterning process is an iterative process, each iteration comprising:
   (i) simulating one or more process models associated with the second patterning process using the first set of process window conditions, the second orientation of the design layout, and the one or more design variables to generate the second set of contours;
   (ii) computing a multi-variate cost function using values of the design variables and simulation results;
   (iii) determining whether the multi-variate cost function satisfies a termination condition;
   (iv) determining whether each contour of the second set of contours is within the desired matching threshold of each corresponding contour of the first set of contours; and
   (v) responsive to the termination condition not being satisfied or the second set of contours not within the desired matching threshold, further modifying the one or more design variables and performing steps (i)-(v).
17. The medium of clause 16, wherein the multi-variate cost function comprises at least one of: edge placement error, pattern placement error, critical dimension (CD), a local CD uniformity, an image contrast of an image associated with a patterning process, resist contour distance, worst defect size, best focus shift, or mask rule check.
18. The medium of any of clauses 16-17, wherein the termination condition comprises at least one of: minimization of the cost function; maximization of the cost function; reaching a certain number of iterations; reaching a value of the cost function equal to or beyond a certain threshold value; reaching a certain computation time; reaching a value of the cost function within an acceptable error limit; or minimizing an exposure time in a lithographic process.
19. The medium of any of clauses 16-18, wherein the cost function is minimized or maximized by a processing the cost function with an algorithm selected from a group consisting of the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.
20. The medium of any of clauses 1-19, wherein the lithographic apparatus is an EUV lithographic apparatus.
21. The medium of any of clauses 1-20, wherein the desired matching threshold is more than 90% matching of each contour of the second set of contours with each corresponding contour of the first set of contours.
22. The medium of any of clauses 1-20, wherein satisfying the desired matching threshold comprises maintaining each contour of the second set of contours within a first contour and a second contour of the first set of contours, the first contour and the second contour being associated with the same process variable having a first extreme value and a second extreme value, respectively.

23. A lithographic apparatus comprising:
an illumination source having an illumination pupil configured to illuminate a mask pattern disposed in a first orientation;
a projection optics configured to project the illuminated mask pattern on a substrate to form a set of structures on the substrate; and
a processor configured to:
determine, based on a design layout associated with the mask pattern in the first orientation, a first set of simulated contours associated with the substrate, and a first set of process window conditions to generate the first set of contours;
change, based on the first set of process window conditions and the first set of contours, the illumination pupil to illuminate the mask pattern disposed in a second orientation, the first orientation, the second orientation being different from the first orientation,
wherein the changed illumination pupil causes a second set of contours to be formed on the substrate, the second set of contours being within a desired matching threshold with the first set of contours.

24. The lithographic apparatus of clause 23, wherein the changed illumination pupil has a different shape and orientation than the illumination pupil used in the first orientation.

25. The lithographic apparatus of clause 23, wherein the second orientation of the mask pattern is orientated at 90° with respect to the first orientation.

26. A non-transitory computer-readable medium for configuring a patterning process of imaging a design layout onto a substrate using a lithographic apparatus, the medium comprising instructions stored therein that, when executed by one or more processors, cause operations comprising:
obtaining a first set of simulated characteristics related a first patterning process by simulating the first patterning process using a first configuration of design variables, each simulated characteristic of the first set of simulated characteristics satisfying a first set of constraints and each simulated characteristic being associated with a particular process window condition; and
configuring a second patterning process based on a subset the first design variables that are configured differently than the first configuration the second patterning process being associated with a second set design variables that affect a second set of contours of the structures, the configuring comprising:
adjusting the second set of design variables until the second set of simulated characteristics are within a desired matching threshold with the first set of simulated characteristics, each of the second set of simulated characteristics being compared with each corresponding first set of simulated characteristics per process window condition.

27. The medium of clause 26, wherein the first configuration of the design variables comprises at least one of:
a first orientation of the design layout to be used in the first patterning process;
a first source variables characterizing a first source to be used in the first patterning process;
a first mask pattern to be used in the first patterning process;
a first resist parameters to be used in the first patterning process;
a first etch parameters to be used in the first patterning process; or
a first aberrations associated with a lithographic apparatus used in the first patterning process.

28. The medium of clause 26, wherein upon configuring the second patterning process, the second set of design variables comprises at least one of:
a second orientation of the design layout used in the second patterning process;
a second source variables characterizing a first source to be used in the second patterning process;
a second mask pattern to be used in the second patterning process;
a second resist parameters to be used in the second patterning process;
a second etch parameters to be used in the second patterning process; or
a second aberrations associated with a lithographic apparatus used in the second patterning process.

29. The medium of clause 26, wherein the first patterning process is associated with a first lithographic apparatus, and the second patterning process is associated with a second lithographic apparatus.

30. The medium of clause 26, wherein the first set of constraints comprises:
design specifications, or
model error distribution associated with one or more model of a patterning process.

31. The medium of clause 26, wherein the simulated characteristics comprises:
simulated contours to be printed on the substrate using the design layout;
an aerial image associated with the design layout;
a resist image associated with the design layout; or
an etch image associated with the design layout.

32. A non-transitory computer-readable medium having instructions stored therein that, when executed by one or more processors, cause operations comprising:
computing a first multi-variate cost function using a first set of design variables associated with a first patterning process, the first set of design variables characterizing a first illumination source, a design layout, and a first process window conditions,
reconfiguring the first patterning process by adjusting the first set of design variables until a termination condition related to design specifications is satisfied to obtain a first set of simulation characteristics,
computing a second multi-variate cost function using a second set of design variables associated with a second patterning process, the second set of design variables characterizing a second illumination source, and the design layout, and
reconfiguring, using the first process window conditions, the second patterning process by adjusting the second set of design variables until a second set of simulation characteristics are within a desired matching threshold of the first set of simulation characteristics.

33. The medium of clause 32, wherein the first of design variables comprises at least one of:
a first orientation of a design layout to be used in the first patterning process;

a first source variables characterizing the first source to be used in the first patterning process;
a first mask pattern to be used in the first patterning process;
a first resist parameters to be used in the first patterning process;
a first etch parameters to be used in the first patterning process; or
a first aberrations associated with a lithographic apparatus used in the first patterning process.

34. The medium of clause 33, wherein upon configuring the second patterning process, the second set of design variables comprises at least one of:
a second orientation of the design layout used in the second patterning process, the second orientation being different from the first orientation;
a second source variables characterizing the second source to be used in the second patterning process, the second source being different from the first source;
a second mask pattern to be used in the second patterning process;
a second resist parameters to be used in the second patterning process;
a second etch parameters to be used in the second patterning process; or
a second aberrations associated with a lithographic apparatus used in the second patterning process.

35. The medium of clause 32, wherein the first patterning process is associated with a first lithographic apparatus, and the second patterning process is associated with a second lithographic apparatus.

36. The medium of clause 32, wherein the first set of constraints comprises:
design specifications, or
model error distribution associated with one or more model of a patterning process.

37. The medium of clause 32, wherein the first simulated characteristics comprises:
simulated contours to be printed on the substrate using the design layout;
an aerial image associated with the design layout;
a resist image associated with the design layout; or
an etch image associated with the design layout.

38. The medium of clause 32, wherein the first multi-variate cost function comprises at least one of: edge placement error of a first set of contours with respect to corresponding design contours of the design layout, pattern placement error associated with the first set of contours, critical dimension (CD) of the first set of contours, a local CD uniformity of the first set of contours, an image contrast of an image associated with the first patterning process, resist contour distance, worst defect size, best focus shift, or mask rule check.

39. The medium of clause 32, wherein the second multi-variate cost function comprises at least one of: edge placement error of a second set of contours with respect to the first set of contours, pattern placement error associated with the second set of contours, critical dimension (CD) of the second set of contours, a local CD uniformity of the second set of contours, an image contrast of an image associated with the second patterning process, resist contour distance, worst defect size, best focus shift, or mask rule check.

40. The medium of any of clauses 38-39, wherein the termination condition comprises at least one of: minimization of the first or the second multi-variate cost function; maximization of the cost function; reaching a certain number of iterations; reaching a value of the cost function equal to or beyond a certain threshold value; reaching a certain computation time; reaching a value of the cost function within an acceptable error limit; or minimizing an exposure time in a lithographic process.

41. The medium of any of clauses 38-40, wherein the first or the second multi-variate cost function is minimized or maximized by a processing the cost function with an algorithm selected from a group consisting of the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.

42. A method for configuring a patterning process of imaging a design layout onto a substrate using a lithographic apparatus, the method comprising:
obtaining a first set of contours of structures on a substrate by simulating a first patterning process using a design layout in a first orientation, each contour within the first set of contours satisfying a design specification associated with the design layout, the first set of contours corresponding to a first set of process window conditions; and
configuring a second patterning process based on a second orientation of the design layout, the first set of process window conditions and first set of contours, the second orientation being different from the first orientation, the second patterning process being associated with one or more design variables that affect a second set of contours of the structures, the configuring comprising:
adjusting one or more design variables until the second set of contours are within a desired matching threshold with the first set of contours, the one or more design variables comprising variables associated with an illumination source of the second patterning process.

43. The method of clause 42, further comprising:
adjusting of the one or more design variables until a performance metric of the second patterning process is within acceptable limits of a first performance metric of the first patterning process.

44. The method of clause 43, wherein the first performance metric comprises:
depth of focus associated with the first patterning process;
an image contrast associated with the first patterning process; and/or a process variation band associated with a process variable of the first patterning process.

45. The method of any of clauses 42-44, wherein the first set of contours comprises a set of simulated contours of the structures associated with the first set of process window conditions.

46. The method of clause 45, wherein the first set of contours comprises:
a first contour obtained using a first process window condition within the first set of process window conditions; and
a second contour obtained using a second process window condition within the first set of process window conditions.

47. The method of any of clauses 42-46, wherein the first set of process window conditions comprises values of process variables related to the first patterning process, the process variables comprising at one of: dose, focus, bias, flare, aberration or a combination thereof.

48. The method of clause 47, wherein:

a first process window condition of the first set of process window conditions comprises a first extreme value of a process variable a second process window condition of the first set of process window conditions comprises a second extreme value of the process variable.

49. The method of any of clauses 42-48, wherein the design variables comprises one or more variables associated with:

an illumination source of the lithographic apparatus;

geometric properties of the design layout;

projection optics of the lithographic apparatus;

a resist process related parameter; and/or a etching process related parameter.

50. The method of any of clauses 42-49, wherein the second orientation is a predetermined rotation amount relatively to the first orientation of the design layout, the predetermined rotation amount relating to an orientation of a portion of the substrate being patterned.

51. The method of clause 50, wherein the predetermined rotation amount is within a range 0°-360° with respect to the first orientation.

52. The method of any of clauses 42-51, wherein the second orientation of the design layout is rotated by 90° with respect to the first orientation of the design layout.

53. The method of any of clauses 42-52, wherein the one or more design variables associated with the second patterning process comprises an illumination pupil shape, the illumination pupil shape being rotated by a different amount than an illumination pupil shape associated with the first patterning process for the same design layout.

54. The method of any of clauses 42-53, wherein the first patterning process includes a first illumination pupil having a first pupil shape in the first orientation, and the second patterning process includes a second illumination pupil having a second shape different from the first illumination pupil shape, and/or an orientation different from the first orientation and second orientation.

55. The method of any of clauses 42-54, wherein configuring the second patterning process comprises:

performing, via one or more process models associated with the second patterning process using the set of first process window conditions as inputs, a source optimization until each of the second set of contours of the second patterning process are within the desired matching threshold with each corresponding contour of the first set of contours.

56. The method of any of clauses 42-55, wherein configuring the second patterning process comprises:

performing, via one or more process models associated with the second patterning process using the set of first process window conditions as inputs, a source mask co-optimization until each of the second set of contours of the second patterning process are within the desired matching threshold with each corresponding contour of the first set of contours.

57. The method of any of clauses 55-56, wherein configuring the second patterning process is an iterative process, each iteration comprising:

(i) simulating one or more process models associated with the second patterning process using the first set of process window conditions, the second orientation of the design layout, and the one or more design variables to generate the second set of contours;

(ii) computing a multi-variate cost function using values of the design variables and simulation results;

(iii) determining whether the multi-variate cost function satisfies a termination condition;

(iv) determining whether each contour of the second set of contours is within the desired matching threshold of each corresponding contour of the first set of contours; and (v) responsive to the termination condition not being satisfied or the second set of contours not within the desired matching threshold, further modifying the one or more design variables and performing steps (i)-(v).

58. The method of clause 57, wherein the multi-variate cost function comprises at least one of: edge placement error, pattern placement error, critical dimension (CD), a local CD uniformity, an image contrast of an image associated with a patterning process, resist contour distance, worst defect size, best focus shift, or mask rule check.

59. The method of any of clauses 57-58, wherein the termination condition comprises at least one of: minimization of the cost function; maximization of the cost function; reaching a certain number of iterations; reaching a value of the cost function equal to or beyond a certain threshold value; reaching a certain computation time; reaching a value of the cost function within an acceptable error limit; or minimizing an exposure time in a lithographic process.

60. The method of any of clauses 57-59, wherein the cost function is minimized or maximized by a processing the cost function with an algorithm selected from a group consisting of the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.

61. The method of any of clauses 42-60, wherein the lithographic apparatus is an EUV lithographic apparatus.

62. The method of any of clauses 42-61, wherein the desired matching threshold is more than 90% matching of each contour of the second set of contours with each corresponding contour of the first set of contours.

63. The method of any of clauses 42-61, wherein satisfying the desired matching threshold comprises maintaining each contour of the second set of contours within a first contour and a second contour of the first set of contours, the first contour and the second contour being associated with the same process variable having a first extreme value and a second extreme value, respectively.

64. A method for configuring a patterning process of imaging a design layout onto a substrate using a lithographic apparatus, the method comprising:

obtaining a first set of simulated characteristics related a first patterning process by simulating the first patterning process using a first configuration of design variables, each simulated characteristic of the first set of simulated characteristics satisfying a first set of constraints and each simulated characteristic being associated with a particular process window condition; and configuring a second patterning process based on a subset the first design variables that are configured differently than the first configuration the second patterning process being associated with a second set design variables that affect a second set of contours of the structures, the configuring comprising:

adjusting the second set of design variables until the second set of simulated characteristics are within a desired matching threshold with the first set of simulated characteristics, each of the second set of simulated characteristics being compared with each corresponding first set of simulated characteristics per process window condition.

65. The method of clause 64, wherein the first configuration of the design variables comprises at least one of:

a first orientation of the design layout to be used in the first patterning process;

a first source variables characterizing a first source to be used in the first patterning process;

a first mask pattern to be used in the first patterning process;

a first resist parameters to be used in the first patterning process;

a first etch parameters to be used in the first patterning process; or a first aberrations associated with a lithographic apparatus used in the first patterning process.

66. The method of clause 64, wherein upon configuring the second patterning process, the second set of design variables comprises at least one of:

a second orientation of the design layout used in the second patterning process;

a second source variables characterizing a first source to be used in the second patterning process;

a second mask pattern to be used in the second patterning process;

a second resist parameters to be used in the second patterning process;

a second etch parameters to be used in the second patterning process; or a second aberrations associated with a lithographic apparatus used in the second patterning process.

67. The method of clause 64, wherein the first patterning process is associated with a first lithographic apparatus, and the second patterning process is associated with a second lithographic apparatus.

68. The method of clause 64, wherein the first set of constraints comprises:

design specifications, or model error distribution associated with one or more model of a patterning process.

69. The method of clause 64, wherein the simulated characteristics comprises:

simulated contours to be printed on the substrate using the design layout;

an aerial image associated with the design layout;

a resist image associated with the design layout; or an etch image associated with the design layout.

70. A method for configuring a patterning process comprising:

computing a first multi-variate cost function using a first set of design variables associated with a first patterning process, the first set of design variables characterizing a first illumination source, a design layout, and a first process window conditions, reconfiguring the first patterning process by adjusting the first set of design variables until a termination condition related to design specifications is satisfied to obtain a first set of simulation characteristics, computing a second multi-variate cost function using a second set of design variables associated with a second patterning process, the second set of design variables characterizing a second illumination source, and the design layout, and reconfiguring, using the first process window conditions, the second patterning process by adjusting the second set of design variables until a second set of simulation characteristics are within a desired matching threshold of the first set of simulation characteristics.

71. The method of clause 70, wherein the first of design variables comprises at least one of:

a first orientation of a design layout to be used in the first patterning process;

a first source variables characterizing the first source to be used in the first patterning process;

a first mask pattern to be used in the first patterning process;

a first resist parameters to be used in the first patterning process;

a first etch parameters to be used in the first patterning process; or a first aberrations associated with a lithographic apparatus used in the first patterning process.

72. The method of clause 71, wherein upon configuring the second patterning process, the second set of design variables comprises at least one of:

a second orientation of the design layout used in the second patterning process, the second orientation being different from the first orientation;

a second source variables characterizing the second source to be used in the second patterning process, the second source being different from the first source;

a second mask pattern to be used in the second patterning process;

a second resist parameters to be used in the second patterning process;

a second etch parameters to be used in the second patterning process; or a second aberrations associated with a lithographic apparatus used in the second patterning process.

73. The method of clause 70, wherein the first patterning process is associated with a first lithographic apparatus, and the second patterning process is associated with a second lithographic apparatus.

74. The method of clause 70, wherein the first set of constraints comprises:

design specifications, or model error distribution associated with one or more model of a patterning process.

75. The method of clause 70, wherein the first simulated characteristics comprises:

simulated contours to be printed on the substrate using the design layout;

an aerial image associated with the design layout;

a resist image associated with the design layout; or an etch image associated with the design layout.

76. The method of clause 70, wherein the first multi-variate cost function comprises at least one of: edge placement error of a first set of contours with respect to corresponding design contours of the design layout, pattern placement error associated with the first set of contours, critical dimension (CD) of the first set of contours, a local CD uniformity of the first set of contours, an image contrast of an image associated with the first patterning process, resist contour distance, worst defect size, best focus shift, or mask rule check.

77. The method of clause 70, wherein the second multi-variate cost function comprises at least one of: edge placement error of a second set of contours with respect to the first set of contours, pattern placement error associated with the second set of contours, critical dimension (CD) of the second set of contours, a local CD uniformity of the second set of contours, an image contrast of an image associated with the second patterning process, resist contour distance, worst defect size, best focus shift, or mask rule check.

78. The method of any of clauses 76-77, wherein the termination condition comprises at least one of: minimization of the first or the second multi-variate cost function; maximization of the cost function; reaching a certain number of iterations; reaching a value of the cost function equal to or beyond a certain threshold value; reaching a certain computation time; reaching a value of the cost function within an acceptable error limit; or minimizing an exposure time in a lithographic process.

79. The method of any of clauses 76-78, wherein the first or the second multi-variate cost function is minimized or maximized by a processing the cost function with an algorithm selected from a group consisting of the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The word "or" should not be considered as excluding any combination of the listed items unless the context requires it.

The descriptions above are intended to be illustrative, not limiting. Thus, it will be apparent to one skilled in the art that modifications may be made as described without departing from the scope of the claims set out below.

The invention claimed is:

1. A non-transitory computer-readable medium comprising instructions stored therein that, when executed by one or more processors, are configured to cause the one or more processors to at least:

obtain a first set of contours of structures on a substrate by simulating a first patterning process using a design layout in a first orientation, each contour within the first set of contours satisfying a design specification associated with the design layout, the first set of contours corresponding to a first set of process window conditions; and configure a second patterning process based on a second orientation of the design layout, the set of process window conditions and the first set of contours, the second orientation being different from the first orientation, the second patterning process being associated with one or more design variables that affect a second set of contours of the structures, the configuration of the second patterning process comprising adjustment of the one or more design variables until the second set of contours are within a desired matching threshold with the first set of contours, the one or more design variables comprising a variable associated with an illumination for use in the second patterning process.

2. The medium of claim 1, wherein the instructions are further configured to cause the one or more processors to adjust the one or more design variables until a performance metric of the second patterning process is within an acceptable limit of a first performance metric of the first patterning process.

3. The medium of claim 2, wherein the first performance metric comprises:

depth of focus associated with the first patterning process;

an image contrast associated with the first patterning process; and/or a process variation band associated with a process variable of the first patterning process.

4. The medium of claim 1, wherein the first set of contours comprises a set of simulated contours of the structures associated with the set of process window conditions.

5. The medium of claim 4, wherein the first set of contours comprises:

a first contour obtained using a first process window condition within the set of process window conditions; and a second contour obtained using a second process window condition within the set of process window conditions.

6. The medium of claim 1, wherein the first set of process window conditions comprises values of process variables related to the first patterning process, the process variables comprising at least one selected from dose, focus, bias, flare, aberration or a combination selected therefrom.

7. The medium of claim 6, wherein:

a first process window condition of the set of process window conditions comprises a first extreme value of a process variable; and a second process window condition of the set of process window conditions comprises a second extreme value of the process variable.

8. The medium of claim 1, wherein the one or more design variables comprise one or more variables associated with:

a geometric property of the design layout;

projection optics of the lithographic apparatus;

a resist process related parameter; and/or an etching process related parameter.

9. The medium of claim 1, wherein the second orientation is a predetermined rotation amount relative to the first orientation of the design layout, the predetermined rotation amount relating to an orientation of a portion of the substrate being patterned.

10. The medium of claim 1, wherein the second orientation of the design layout is rotated by 90° with respect to the first orientation of the design layout.

11. The medium of claim 1, wherein the one or more design variables associated with the second patterning process comprises an illumination pupil shape, the illumination pupil shape being rotated by a different amount than an illumination pupil shape associated with the first patterning process for the same design layout.

12. The medium of claim 1, wherein the first patterning process includes a first illumination pupil having a first pupil shape in the first orientation, and the second patterning process includes a second illumination pupil having a second shape different from the first illumination pupil shape, and/or an orientation different from the first orientation and second orientation.

13. The medium of claim 1, wherein the instructions configured to cause the one or more processors to configure the second patterning process are further configured to cause the one or more processors to perform, via one or more process models associated with the second patterning process using the set of first process window conditions as inputs, a source optimization until each contour of the second set of contours of the second patterning process are within the desired matching threshold with each corresponding contour of the first set of contours.

14. The medium of claim 1, wherein the instructions configured to cause the one or more processors to configure the second patterning process are further configured to cause the one or more processors to perform, via one or more process models associated with the second patterning process using the set of first process window conditions as inputs, a source mask co-optimization until each contour of the second set of contours of the second patterning process are within the desired matching threshold with each corresponding contour of the first set of contours.

15. A non-transitory computer-readable medium comprising instructions stored therein that, when executed by one or more processors, are configured to cause the one or more processors to at least:

obtain a first set of simulated characteristics related to a first patterning process by simulation of the first patterning process using a configuration of design variables, each simulated characteristic of the first set of simulated characteristics satisfying a set of constraints and each simulated characteristic being associated with a particular process window condition; and configure a second patterning process based on a subset of the one or more design variables that are configured differently than the configuration, the second patterning process associated with one or more design variables that affect generation of structures on a substrate, the configuration of the second patterning process comprising adjustment of the one or more design variables of the second patterning process until a second set of simulated characteristics related to the second patterning process are within a desired matching threshold with the first set of simulated characteristics, each simulated characteristic of the second set of simulated characteristics being compared with each corresponding simulated characteristic of the first set of simulated characteristics per process window condition.

16. The medium of claim 15, wherein the configuration of the design variables comprises at least one selected from:

an orientation of the design layout to be used in the first patterning process;

a variable characterizing an illumination to be used in the first patterning process;

a mask pattern to be used in the first patterning process;

a resist parameter to be used in the first patterning process;

an etch parameter to be used in the first patterning process; or an aberration associated with a lithographic apparatus used in the first patterning process.

17. The medium of claim 15, wherein upon configuration of the second patterning process, the one or more design variables of the second patterning process comprises at least one selected from:

an orientation of the design layout used in the second patterning process;

a variable characterizing an illumination to be used in the second patterning process;

a mask pattern to be used in the second patterning process;

a resist parameters to be used in the second patterning process;

an etch parameters to be used in the second patterning process; or an aberration associated with a lithographic apparatus used in the second patterning process.

18. The medium of claim 15, wherein the first patterning process is associated with a first lithographic apparatus, and the second patterning process is associated with a second lithographic apparatus.

19. The medium of claim 15, wherein the set of constraints comprises:

design specifications, or a model error distribution associated with one or more models of a patterning process.

20. The medium of claim 15, wherein the first set or second set of simulated characteristics comprises:

a simulated contour to be printed on the substrate using the design layout;

an aerial image associated with the design layout;

a resist image associated with the design layout; or an etch image associated with the design layout.

* * * * *